United States Patent
Yuki et al.

(10) Patent No.: US 8,073,343 B2
(45) Date of Patent: Dec. 6, 2011

(54) INPUT SIGNAL DETECTION DEVICE

(75) Inventors: Masahiro Yuki, Kawasaki (JP); Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 12/078,343

(22) Filed: Mar. 28, 2008

(65) Prior Publication Data

US 2010/0284689 A1    Nov. 11, 2010

(30) Foreign Application Priority Data

Mar. 29, 2007    (JP) .................... 2007-087848

(51) Int. Cl.
*H04B 10/06* (2006.01)
*H04B 10/08* (2006.01)
(52) U.S. Cl. ............... 398/202; 398/33; 398/25; 398/38
(58) Field of Classification Search ............ 398/33, 398/38, 25, 34, 202, 208, 203, 204, 151
See application file for complete search history.

(56) References Cited

U.S. PATENT DOCUMENTS

| | | | |
|---|---|---|---|
| 5,805,319 A | 9/1998 | Chuzenji | |
| 7,212,741 B2* | 5/2007 | Myong et al. | 398/27 |
| 2004/0067057 A1 | 4/2004 | Akiyama et al. | |
| 2004/0126108 A1* | 7/2004 | Chung et al. | 398/26 |

FOREIGN PATENT DOCUMENTS

| | | |
|---|---|---|
| JP | 9-200157 | 7/1997 |
| JP | 2004-112427 | 4/2004 |

OTHER PUBLICATIONS

Office Action issued by the Japanese Patent Office on Jul. 26, 2011 in the corresponding Japanese patent application No. 2007-087848.

* cited by examiner

*Primary Examiner* — M. R. Sedighian
(74) *Attorney, Agent, or Firm* — Staas & Halsey LLP

(57) ABSTRACT

According to an aspect of an embodiment, a signal detector device includes a first monitor unit, a second monitor unit, and a discrimination unit, wherein the discriminator unit discriminates whether an inputted light includes a signal light on the bases of the first monitor unit for monitoring an intensity of the inputted light and the second monitor unit for monitoring an alternating current component intensity of the inputted light.

9 Claims, 28 Drawing Sheets

INPUT SIGNAL DETECTION DEVICE

CROSS-REFERENCE TO RELATED APPLICATIONS

This application is based upon and claims the benefit of priority from the prior Japanese Patent Application No. 2007-087848, filed on Mar. 29, 2007, the entire contents of which are incorporated herein by reference.

BACKGROUND

The present invention relates to an input signal detection device for detecting whether or not an optical signal has been inputted to an optical device such as an optical amplifier in an optical communication system and an optical device control apparatus using the result of the detection.

FIG. 28 shows a configuration example of a related art optical communication system using the wavelength division multiplexing (WDM) technology. This optical communication system includes an optical transmission device 11, transmission line fibers 12, 14, and 16, optical amplification relays 13 and 15, and an optical reception device 17.

Among these, the optical transmission device 11 includes optical transmitters 21-1 to 21-n, an optical multiplexer 22, and an optical amplifier 23. The optical reception device 17 includes an optical amplifier 24, an optical demultiplexer 25, optical amplifiers 26-1 to 26-n, variable wavelength dispersion compensators 27-1 to 27-n, and optical receivers 28-1 to 28-n. The optical amplification relays 13 and 15 and the optical amplifiers 23 and 24 each amplify a WDM signal as a single unit, while the optical amplifiers 26-1 to 26-n each amplify an optical signal of one wavelength.

One of optical amplifiers that are currently most widely used is an erbium-doped fiber amplifier (EDFA) that uses an induced emission of a rare earth element, erbium, which is added to the core of an optical fiber. The optical amplification relays 13 and 15 amplify optical signals that have been transmitted through the transmission line fibers 12 and 14, respectively, and have reduced their power.

At this time, simultaneously with the amplification of each optical signal, an amplified spontaneous emission (ASE) occurs that has a random amplitude, phase, polarized wave, and the like due to the induced emission. Thus, the optical signal to noise ratio (OSNR) is deteriorated. This ASE is amplified and accumulated each time it passes through an optical amplification relay, and is finally inputted to the optical reception device 17 together with an optical signal.

In an example shown in FIG. 28, light including a WDM signal 31 and an ASE 32 is outputted from the optical transmission device 11. Then, light including a WDM signal 33 and an ASE 34 is inputted to the optical demultiplexer 25 of the optical reception device 17 and light including an optical signal 35 of one wavelength and an ASE 36 is inputted to the optical amplifier 26-2.

A tolerance to wavelength dispersion is significantly reduced in a high-speed optical transmission system having a transmission speed per wavelength of 40 Gbit/s; therefore, a highly accurate wavelength dispersion compensation is needed. For this reason, the variable dispersion compensators 27-1 to 27-n are provided in the optical reception device 17. This allows a highly accurate wavelength dispersion compensation for each channel, as well as allows constant optimization of the amount of dispersion compensation while following temporal variations in wavelength dispersion value with time during operation of the system. Also, if signal quality significantly deteriorates due to polarization mode dispersion (PMD), a PMD compensator may be disposed between the optical demultiplexer 25 and the optical receivers 28-1 to 28-n in order to compensate for such deterioration.

However, application of the variable wavelength dispersion compensators 27-1 to 27-n or the PMD compensator may increase optical loss, thereby causing lack of light power over the input dynamic ranges of the optical receivers 28-1 to 28-n that are disposed after these components. In this case, input power to the optical receivers 28-1 to 28-n is secured by amplifying the optical signals using the optical amplifiers 26-1 to 26-n.

FIG. 29 shows a system for controlling such an optical amplifier for loss compensation. An optical amplifier 42 amplifier is provided before an optical receiver 43 so as to amplify input light. An optical coupler 41 and a photodiode (PD) 44 are provided on the input side of the optical amplifier 42 so as to monitor input light. According to a monitor signal from the PD 44, a processor 45 determines whether or not an optical signal has been inputted. The controller 46 controls operations of the optical amplifier 42 according to the result of the determination.

As shown in FIG. 30, the processor 45 sets a shutdown threshold Pth of light power near the lower limit value of the signal input range. If monitored light power is higher than the Pth, the processor 45 determines that a signal has been inputted. If monitored light power is lower than the Pth, it determines that no signal has been inputted. If a signal has been inputted, the processor 46 causes the optical amplifier 42 to operate; if no signal has been inputted, it causes the optical amplifier 42 to stop operating (that is, it shuts down the optical amplifier 42).

Therefore, if an optical signal is turned off at a time t1 and input light power 51 of the optical amplifier 42 falls below the Pth, the optical amplifier 42 is shut down and output light power 52 of the optical amplifier 42 comes close to zero.

Japanese Laid-open Patent Publication No. 2004-112427 relates to a method for monitoring the OSNR in an optical transmission system.

The above-mentioned related art optical amplifier control method has the following problem.

As shown in FIG. 31, if only one channel of a WDM signal is turned off due to breakage, removal, or the like of a optical fiber of the optical transmitter 21-2 during operation of the WDM communication system having n channels, only an ASE that has occurred and accumulated in the optical amplification relays disposed between the optical transmission unit and the optical reception unit is inputted to the optical amplifier 26-2 corresponding to that channel.

If this ASE power is larger than the lower limit value of the signal input dynamic range of the optical amplifier 26-2, input light power 61 does not fall below the shutdown threshold Pth even if the signal is turned off at the time t1, as shown in FIG. 32. As a result, a distinction cannot be made between the signal and the ASE, whereby the optical amplifier 26-2 will not be shut down.

Then, if the signal is turned on at a time t2 with the optical amplifier 26-2 operational and the optical signal is inputted to the optical amplifier 26-2, an optical surge 63 occurs as shown in output light power 62. Thus the optical receiver 28-2 disposed after the optical amplifier 26-2 will be broken.

Also, if the optical amplifier is mistakenly started when only an ASE has been inputted at an initial start of the WDM communication system, an optical surge occurs at an instant when an optical signal is actually inputted afterward. Thus, the optical receiver will be broken as well.

To prevent such an erroneous determination, a method is considered in which an input signal detection device as shown in FIG. 33 is used. An input signal detection device includes an optical coupler 72, a high-speed PD 73, a band path filter (BPF) 74, and an intensity monitor 75. A monitor signal outputted from the high-speed PD 73 is transferred to the intensity monitor 75 via the BPF 74, and the intensity monitor 75 monitors the intensity of components of the signal and outputs the monitor signal to the controller 76. According to the monitor signal from the intensity monitor 75, the controller 76 determines whether or not an optical signal has been inputted, and controls the operation of the optical amplifier 42.

Monitoring the intensity of the signal components at the input terminal of the optical amplifier 42 in this way allows determination whether a signal has been inputted or only an ASE has been inputted. However, disposing the input signal detection device 71 by the number of wavelengths requires use of many high-frequency parts. This will make the system very costly.

SUMMARY

Accordingly, an object of an aspect of present invention is to detect whether or not inputted light including a signal.

According to an aspect of an embodiment, a signal detector device includes a first monitor unit, a second monitor unit, and a discriminator unit.

The discriminator unit discriminates whether an inputted light includes a signal light on the bases of the first monitor unit for monitoring an intensity of the inputted light and the second monitor unit for monitoring an alternating current component intensity of the inputted light.

DETAILED DESCRIPTION OF THE EMBODIMENTS

A preferred embodiment to carry out the present invention will now described in detail with reference to the accompanying drawings.

Figure 1:
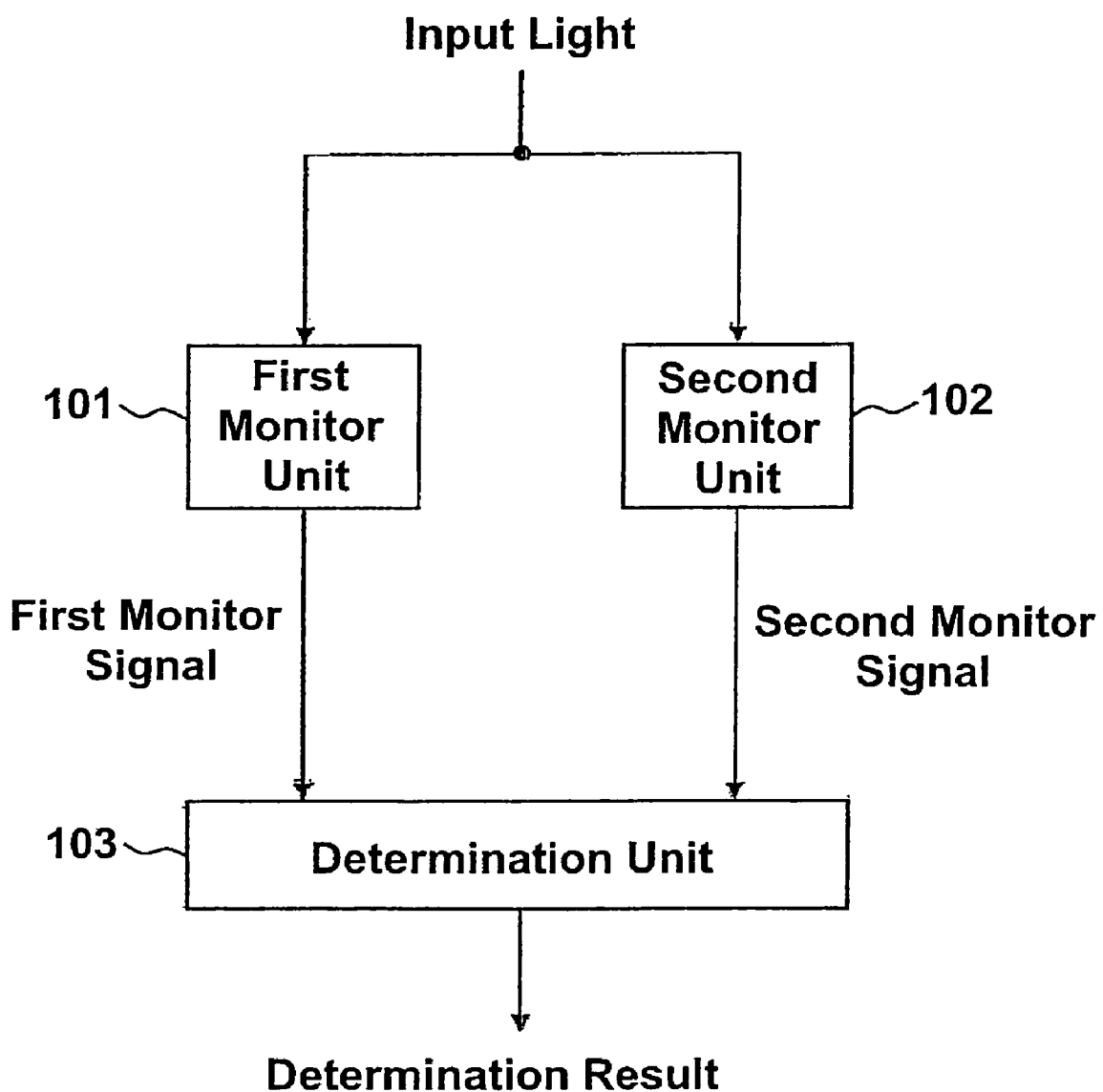
FIG. 1 is a principle diagram of an input signal detection device.

FIG. 1 is a diagram of an input signal detection device according to an embodiment. The input signal detection device 71 or 603 or 1806 shown in FIG. 1 includes first monitoring unit 101, second monitoring unit 102, and determination unit 103.

The first monitoring unit 101 monitors the intensity of input light and outputs a first monitor signal indicating the intensity of the input light. The second monitoring unit 102 monitors the intensity of the alternating current component of the input light and outputs a second monitor signal indicating the alternating current intensity. Using the first and second monitor signals, the determination unit 103 determines whether or not signal light is contained in the input light.

An alternating current (AC) component and a direct current (DC) component are contained in input light, and the DC intensity is dominant in the intensity of the input light. Therefore, it is difficult to distinguish between a state in which signal light and an ASE are contained in the input light and a state in which an ASE is contained therein, according to the intensity of the input light. However, monitoring the AC intensity as well as the input light intensity allows these two input states to be easily distinguished from each other.

Also, if light on the input side or output side of the optical device is inputted to an input signal detection device and it is determined whether or not signal light is contained in the inputted light, the optical device is properly controlled according to the result of the determination.

The first monitoring unit 101 includes, for example, an intensity monitor 205 to be discussed later, and the second monitoring unit 102 includes, for example, a DC block 203 and an intensity monitor 204. The determination unit 103 corresponds to, for example, a determination processor 206.

In this embodiment, after input light is photoelectric-converted, the AC intensity of the low frequency range is monitored. Then, the input state is determined using a fact that there is a difference in monitor intensity between a case where an optical signal has been inputted and a case where an ASE has been inputted. Then, the operation of an optical amplifier is controlled using the result of the determination.

Figure 2:
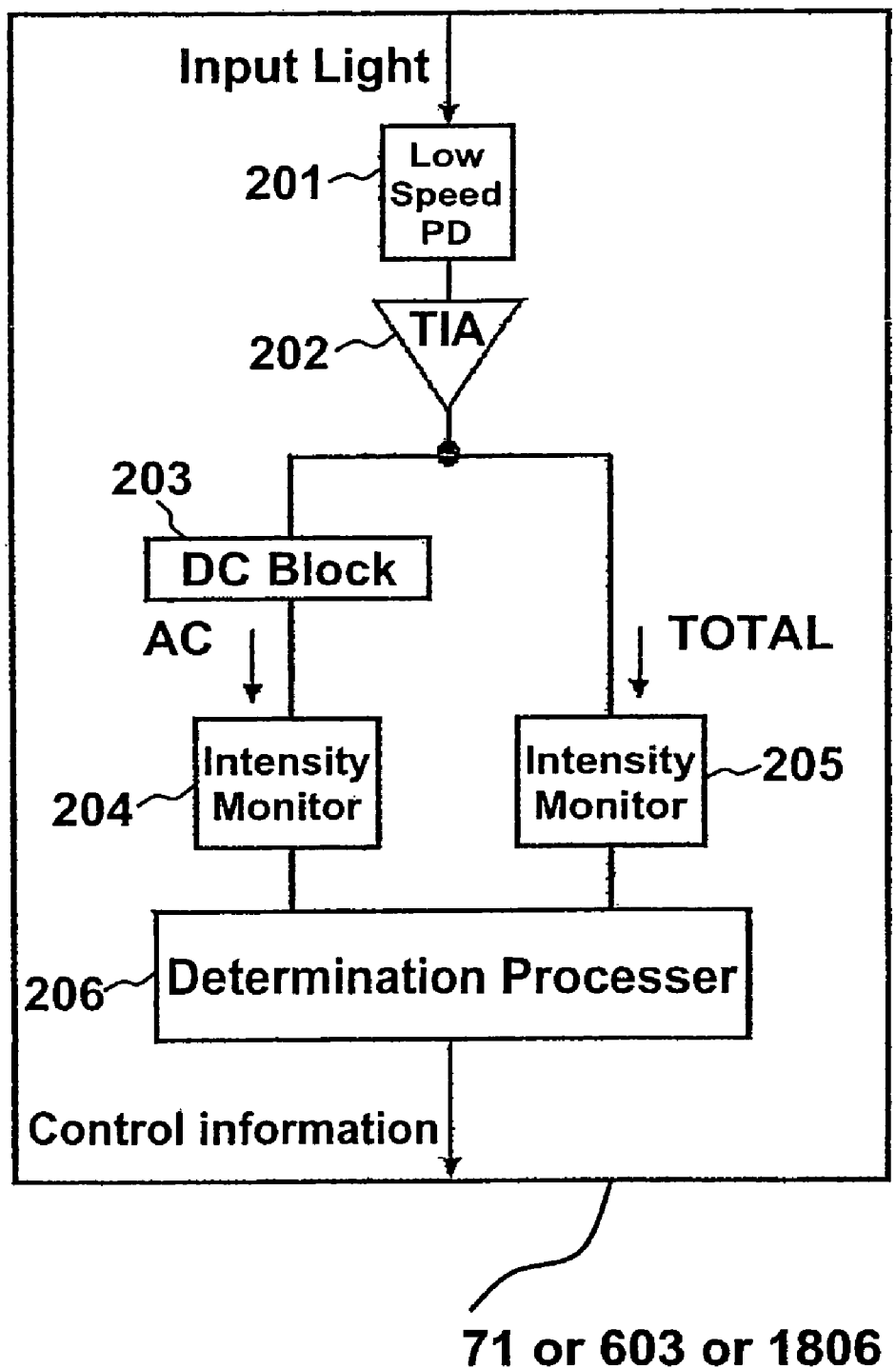
FIG. 2 shows a configuration example of a first input signal detection device.

FIG. 2 shows a configuration example of such an input signal detection device 71 or 603 or 1806. This input signal detection device 71 or 603 or 1806 includes a low-speed PD 201, a transimpedance amplifier (TIA) 202, a DC block 203, intensity monitors 204 and 205, and a determination processor 206.

The low-speed PD 201 converts input light into an electric signal. The transimpedance amplifier (TIA) 202 amplifies the PD output current to convert the voltage. The DC block 203 blocks the DC component of the output of the TIA 202 and outputs the AC component thereof to the intensity monitor 204. The intensity monitor 204 outputs the signal intensity of the inputted AC component. The intensity monitor 205 outputs the signal intensity of the output of the TIA 202 as total intensity. The determination processor 206 determines the input state using the AD intensity from the intensity monitor 204 and the total intensity from the intensity monitor 205, and outputs the result of the determination as control information.

Figure 3:
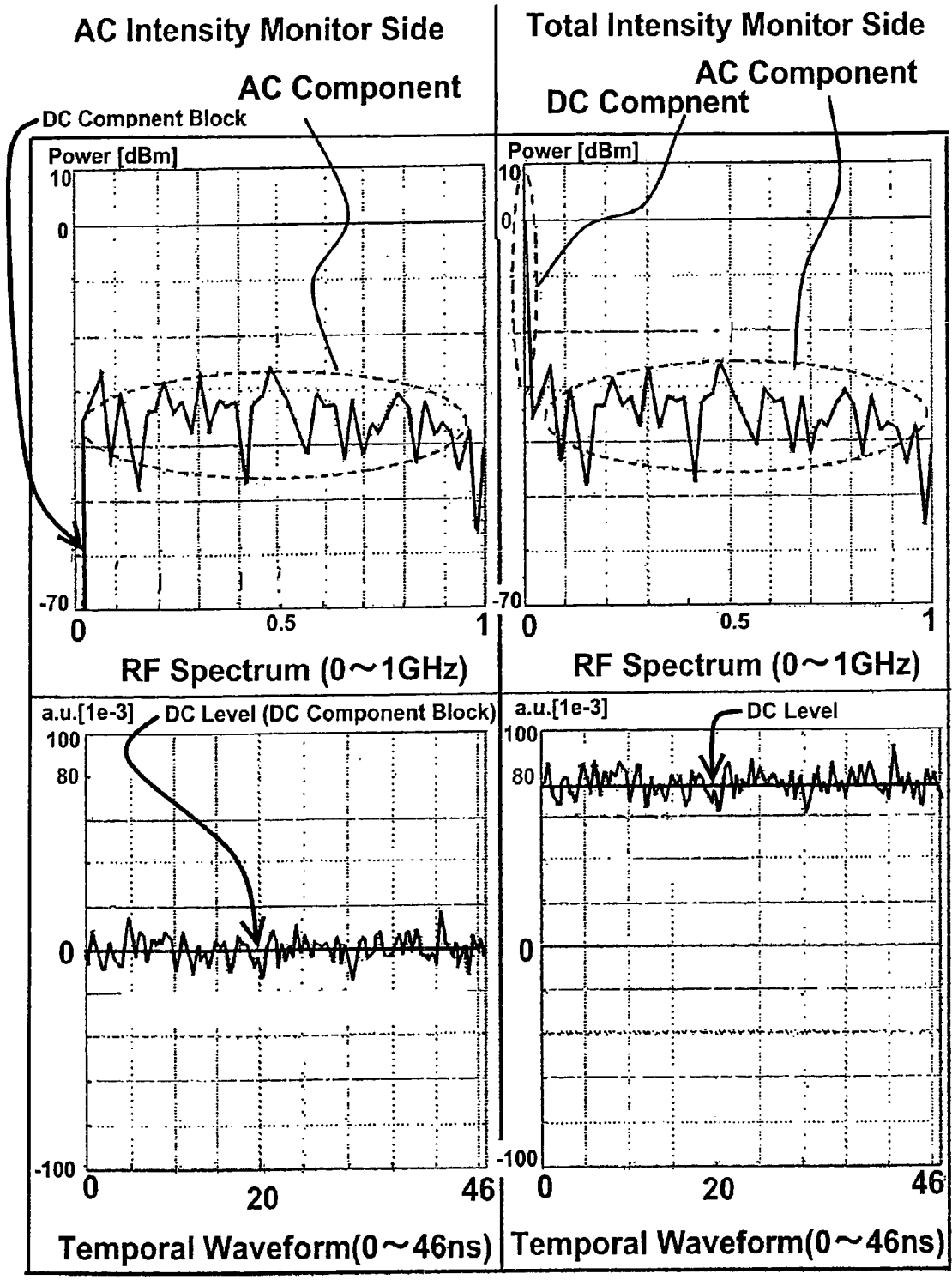
FIG. 3 is graphs showing the spectrums and temporal waveforms at the input terminals of two intensity monitors.

FIG. 3 shows results of simulations of the spectrum and temporal waveform at the input terminal of each intensity monitor. It is assumed in these simulations that the response speed of the low-speed PD 201 is a speed sufficiently lower than the speed of the optical signal and that the DC block 203 includes, for example, a capacitor.

From an example shown in FIG. 3, it is understood that a DC component is not contained in any of the spectrum and temporal waveform at the input terminal of the AC intensity monitor 204 and that a DC component is contained in each of the spectrum and temporal waveform at the input terminal of the total intensity monitor 205.

Figure 4:
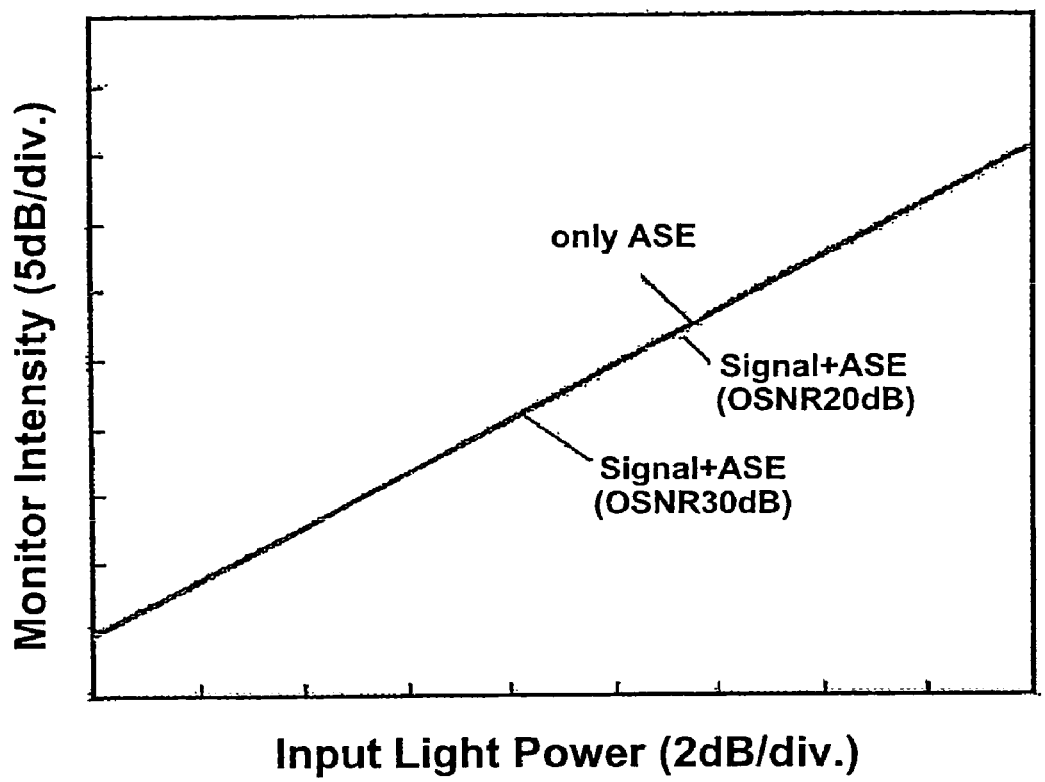
FIG. 4 is a graph showing the dependence of the total intensity on the input light power.
Figure 5:
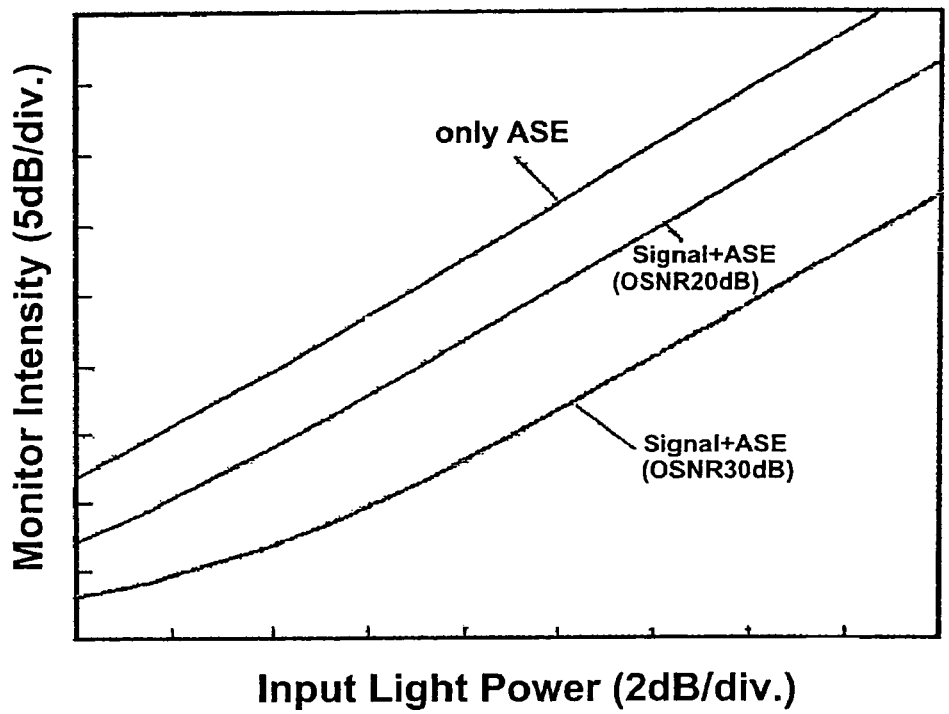
FIG. 5 a graph showing the dependence of the AC intensity on the input light power.

FIG. 4 shows the dependence of the total intensity on the input light power, and FIG. 5 shows the dependence of the AC intensity on the input light power. Since the DC intensity is dominant in the total intensity, the dependence of the total intensity on the input light power in a case where only an ASE has been inputted and that in a case where an optical signal and an ASE have been inputted are nearly matched with each other. On the other hand, the dependence of the AC intensity on the input light power varies according to the input state.

In FIG. 5, the dependence of the AC intensity on the input light power in a case where only an ASE has been inputted and that in a case where an optical signal and an ASE have been inputted differ from each other. The dependence of the AC intensity on the input light power also varies according to the OSNR. Therefore, monitoring the AC intensity and total intensity allows a distinction between a state in which only an ASE has been inputted and a state in which an optical signal has been inputted.

A specific method for determining the input state and a method for controlling an optical amplifier using the result of the determination will now be described using specific examples.

Figure 6:
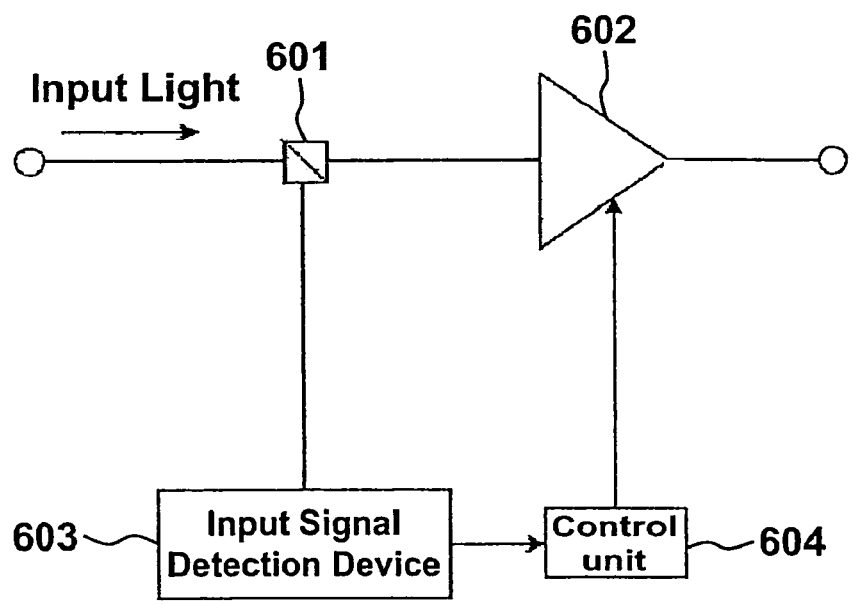
FIG. 6 is a configuration diagram of a first optical amplifier control system.

FIG. 6 shows a configuration example of an optical amplifier control system. This system includes an optical coupler 601, an optical amplifier 602, a input signal detection device 603, and a controller 604. The input signal detection device 603 has the configuration shown in FIG. 2 and determines the input state in the input terminal of the optical amplifier 602 via the optical coupler 601. The controller 604 controls the operation of the optical amplifier 602 using the result of the determination.

In this case, only an ASE is previously inputted to the input signal detection device 603 so as to obtain the relation between the AC intensity and total intensity, and the relation is stored as a data table in the determination processor 206 of the input signal detection device 603.

Figure 7:
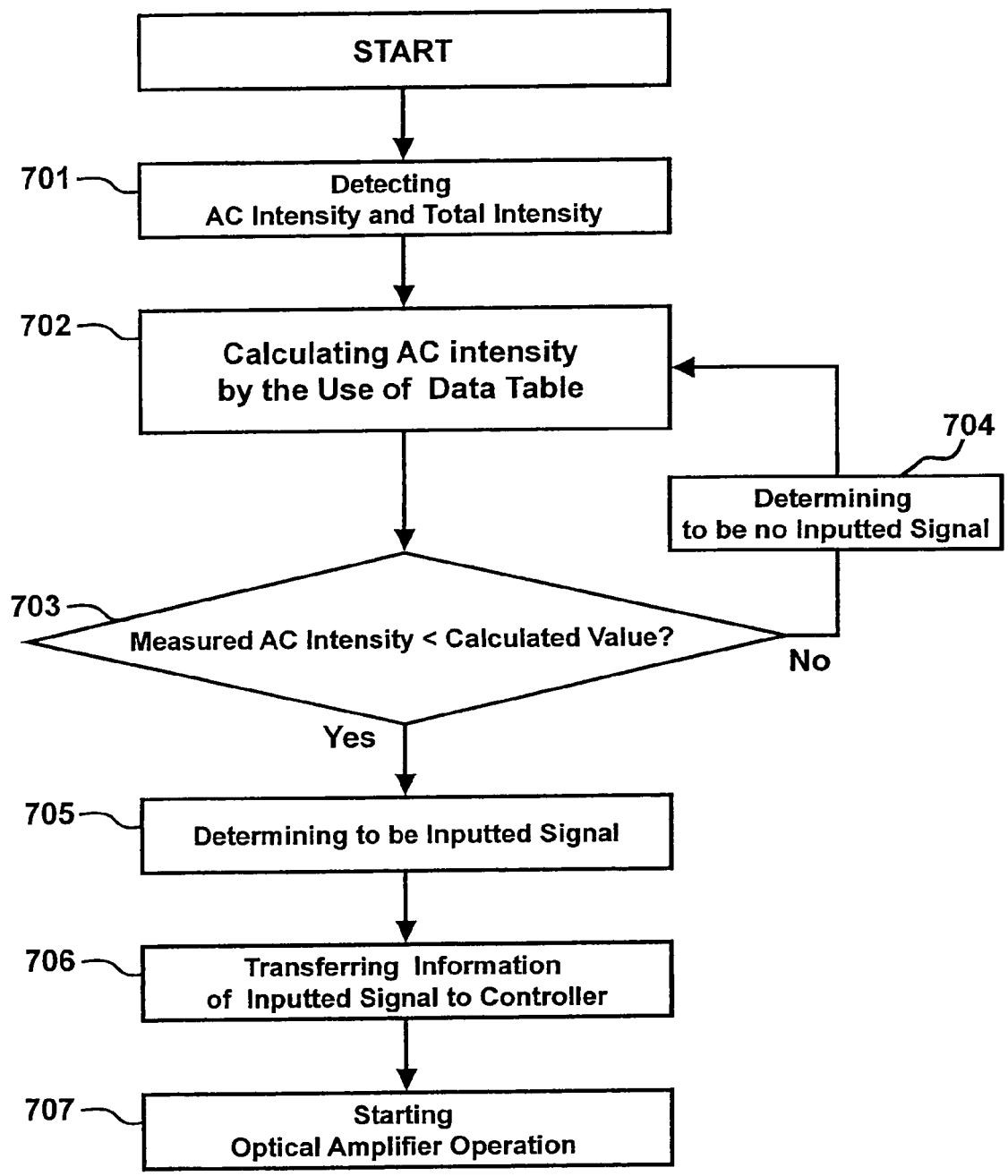
FIG. 7 is a flowchart of first optical amplifier start control.

FIG. 7 is a flowchart of optical amplifier start control in a state in which an optical amplifier is stopping. The intensity monitors 204 and 205 of the input signal detection device 603 measure the AC intensity and total intensity (step 701).

Next, the determination processor 206 calculates AC intensity corresponding to the measured value of the total intensity using the data table (step 702), and compares the obtained calculated value with the measured value of the AC intensity (step 703). If the measured value of the AC intensity is equal to or larger than the calculated value, the determination processor 206 determines that no signal has been inputted, that is, determines that only an ASE has been inputted (step 704), and repeats the operations in steps 701 and later.

If the measured value of the AC intensity is smaller than the calculated value, the determination processor 206 determines that a signal has been inputted (step 705), and transfers information indicating that a signal has been inputted, to the controller 604 (step 706). Then, the controller 604 starts the optical amplifier 602 according to the information indicating that a signal has been inputted (step 707).

Figure 8:
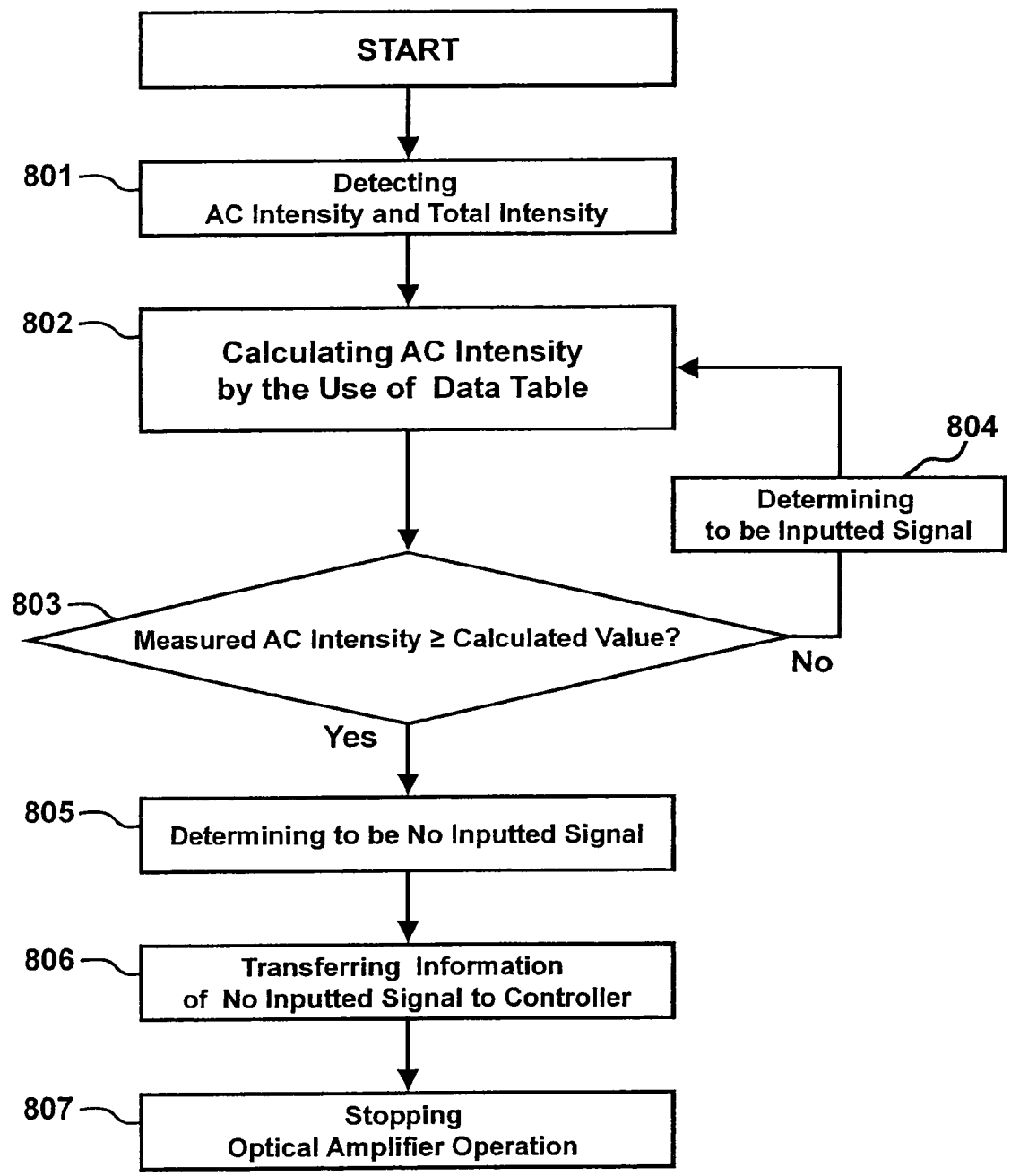
FIG. 8 is a flowchart of first optical amplifier stop control.

FIG. 8 is a flowchart of optical amplifier stop control in a state in which an optical amplifier is operating. Operations in steps 801 to 803 are similar to those in steps 701 to 703.

If the measured value of the AC intensity is smaller than the calculated value in step 803, the determination processor 206 determines that a signal has been inputted (step 804), and repeats the operations in steps 801 and later.

If the measured value of the AC intensity is equal to or larger than the calculated value, the determination processor 206 determines that no signal has been inputted, that is, determines that only an ASE has been inputted (step 805), and transfers information indicating that no signal has been inputted, to the controller 604 (step 806). Then, the controller 604 causes the optical amplifier 602 to stop operating, according to the information indicating that no signal has been inputted (step 807).

Figure 9:
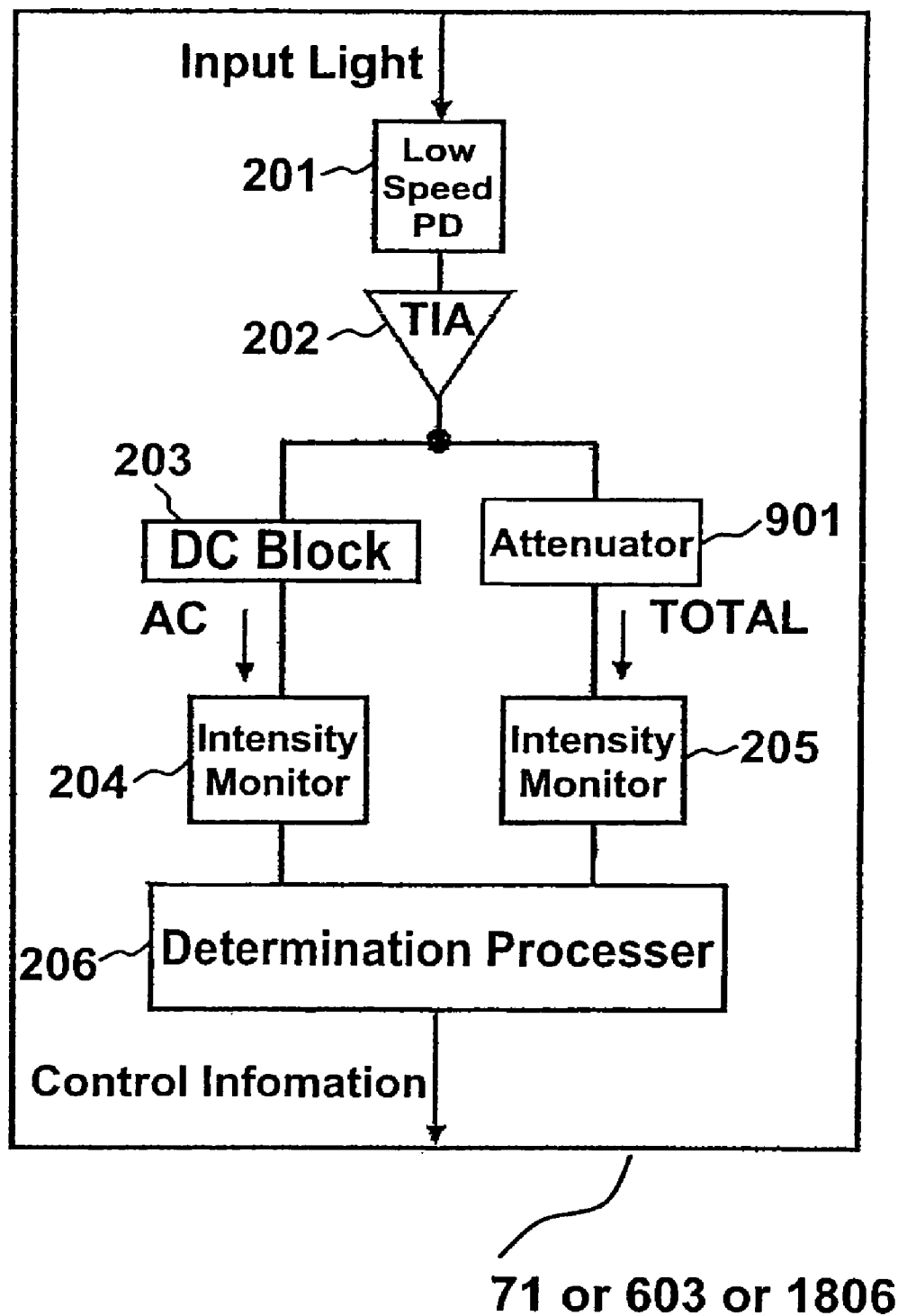
FIG. 9 is a configuration diagram of a second input signal detection device.

FIG. 9 shows another configuration example of the input signal detection device. This input signal detection device has a configuration in which an attenuator 901 is provided between the TIA 202 and the intensity monitor 205 in the input signal detection device shown in FIG. 2, so as to assign weights to the AC intensity and total intensity. For example, an attenuator is used as the attenuator 901.

Figure 10:
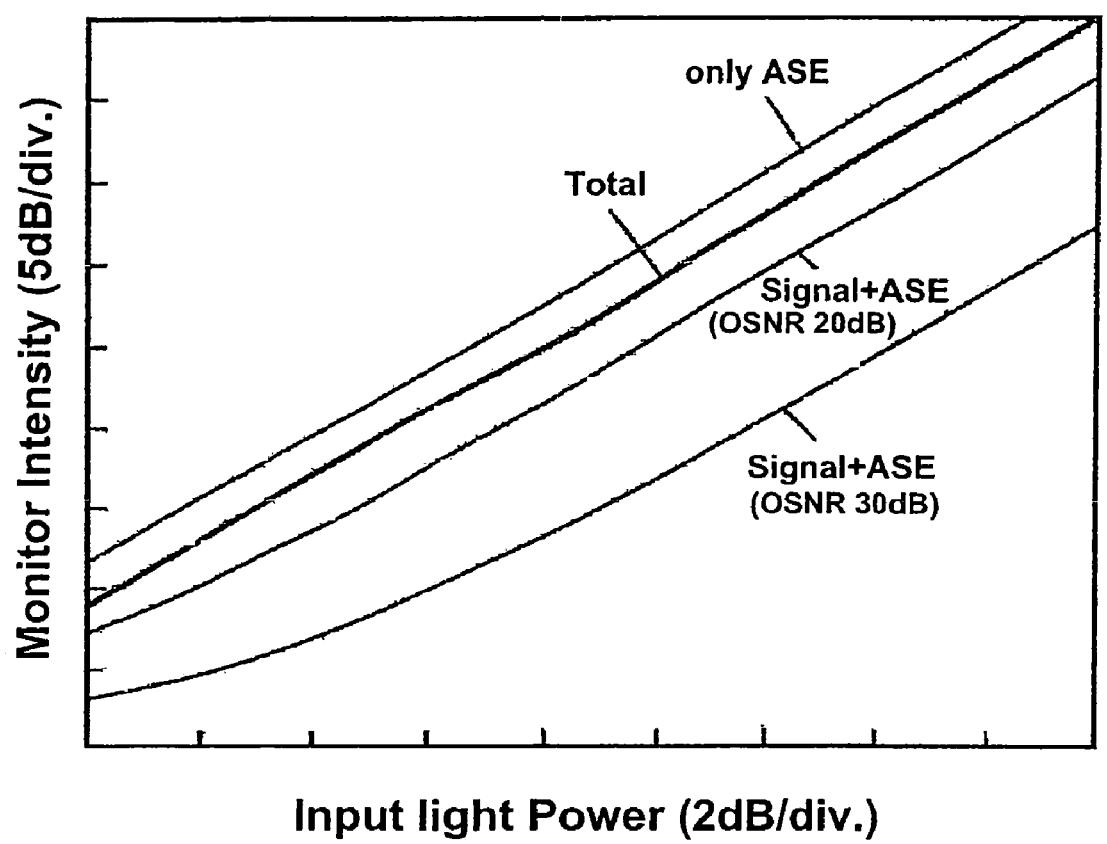
FIG. 10 is a graph showing the dependence of the monitor intensity on the input light power in a case where a loss part is provided.

In this case, attenuating an input signal of the intensity monitor 205 by the attenuator 901 allows a reduction in measured value of the total intensity. As a result, the dependence of the AC intensity on the input light power and the dependence of the total intensity on the input light power become what are shown in FIG. 10. The amount of loss produced by the attenuator 901 is adjusted so that total intensity is detected between the AC intensity in a case where only an ASE has been inputted and that in a case where a signal and an ASE have been inputted.

Thus, the input state is determined by only comparing the magnitude relation between the AC intensity and total intensity. This makes the data table for determination unnecessary, thereby simplifying the configuration of the determination processor 206.

Figure 11:
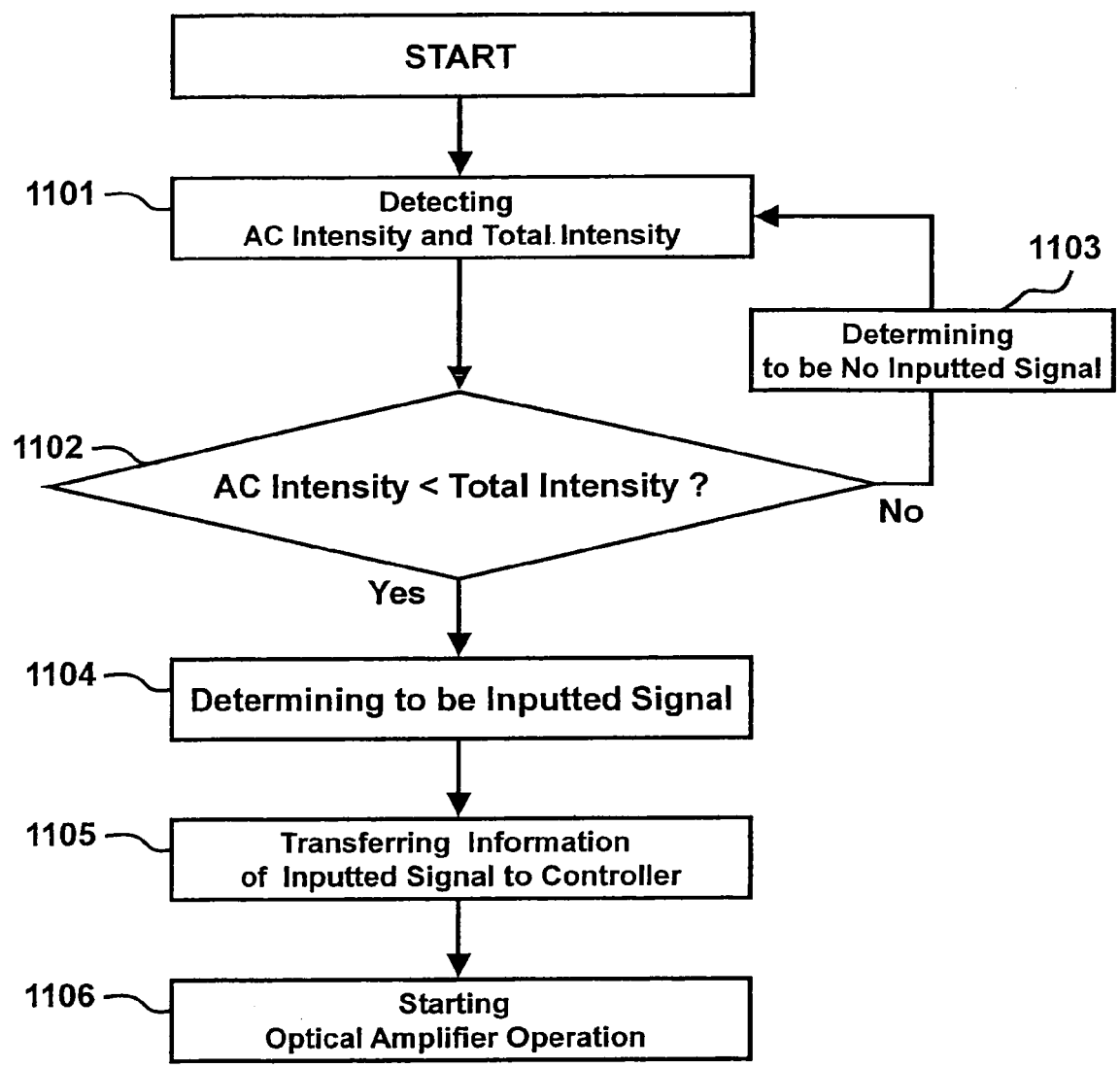
FIG. 11 is a flowchart of second optical amplifier start control.

FIG. 11 is a flowchart of optical amplifier start control in a case where the configuration shown in FIG. 9 is used as the input signal detection device 603 shown in FIG. 6. First, the intensity monitors 204 and 205 measure the AC intensity and total intensity (step 1101).

Next, the determination processor 206 compares the measured value of the AC intensity with the measured value of the total intensity (step 1102). If the measured value of the AC intensity is larger than the measured value of the total intensity, the determination processor 206 determines that no signal has been inputted (step 1103), and repeats the operations in steps 1101 and later.

If the AC intensity is smaller than the total intensity, the determination processor 206 determines that a signal has been inputted (step 1104), and transfers information indicating that a signal has been inputted, to the controller 604 (step 1105). Then, the controller 604 starts the optical amplifier 602 according to the information indicating that a signal has been inputted (step 1106).

Figure 12:
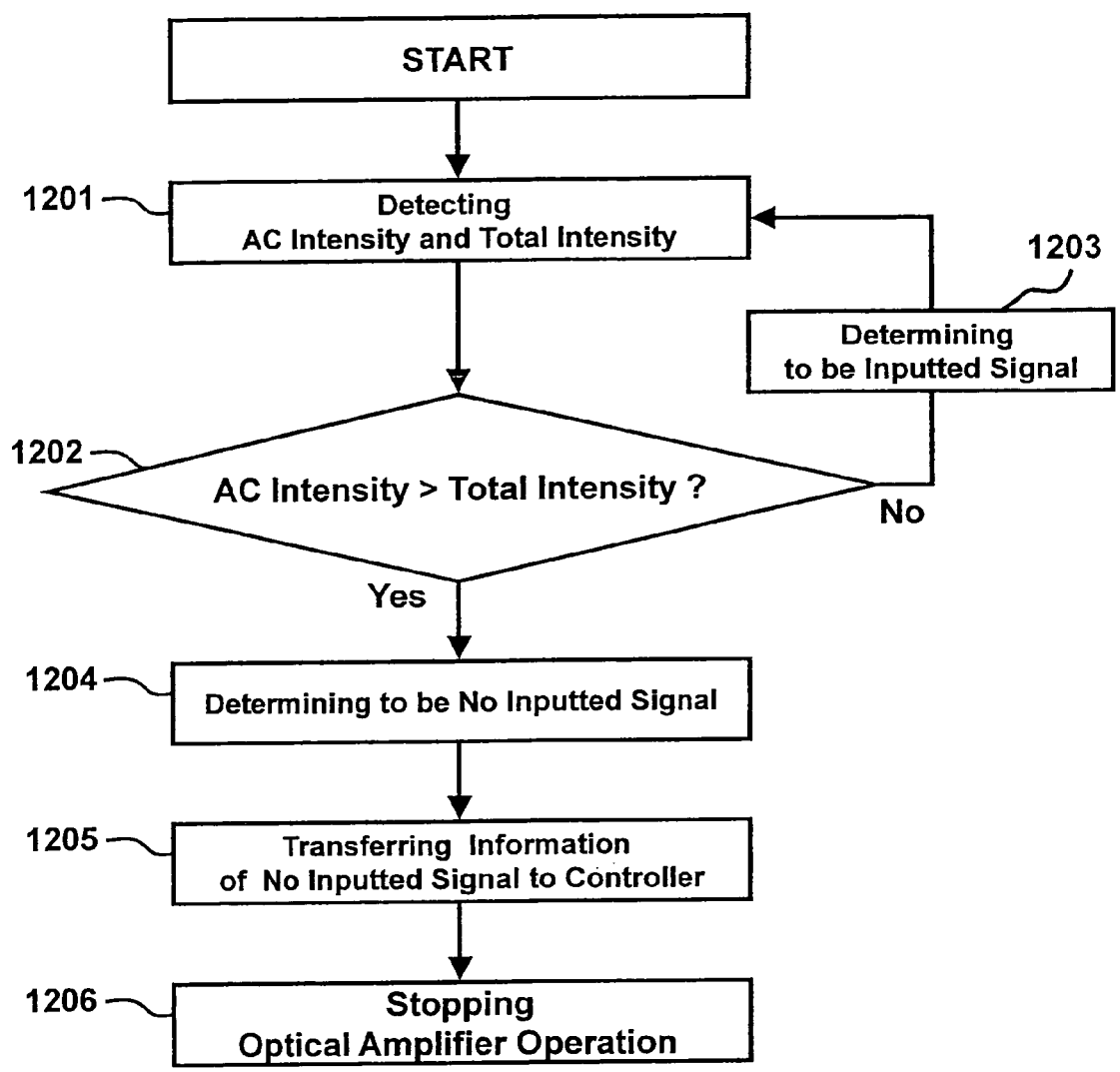
FIG. 12 is a flowchart of second optical amplifier stop control.

FIG. 12 is a flowchart of optical amplifier stop control in a case where the input signal detection device shown in FIG. 9 is used. Operations in steps 1201 and 1202 are similar to those in steps 1101 and 1102 shown in FIG. 11.

If the AC intensity is smaller than the total intensity, the determination processor 206 determines that a signal has been inputted (step 1203), and repeats the operations in steps 1201 and later.

If the AC intensity exceeds the total intensity, the determination processor 206 determines that no signal has been inputted (step 1204), and transfers information indicating that no signal has been inputted, to the controller 604 (step 1205). Then, the controller 604 causes the optical amplifier 602 to stop, according to the information indicating that no signal has been inputted (step 1206).

Figure 13:
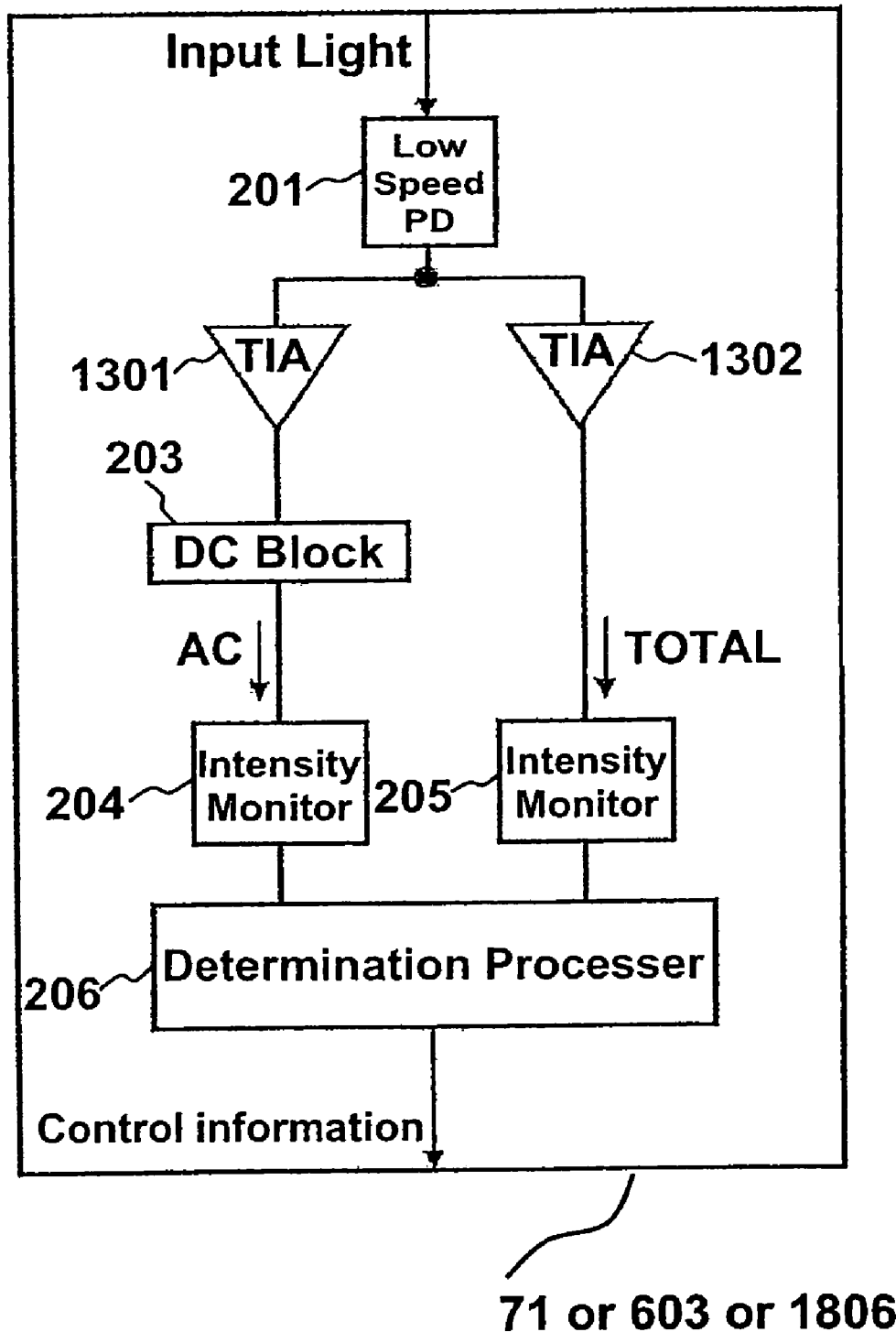
FIG. 13 is a configuration diagram of a third input signal detection device.

While a weight is assigned to each monitor intensity in the input signal detection device shown in FIG. 9 by providing the attenuator 901 in the apparatus, TIAs having different gains may be provided near the AC intensity monitor and near the total intensity monitor as another method, as shown in FIG. 13.

In the input signal detection device shown 71 or 603 or 1806 in FIG. 13, a TIA 1301 having a gain G1 is disposed between the low-speed PD 201 and the DC block 203, and a TIA 1302 having a gain G2 is disposed between the low-speed PD 201 and the intensity monitor 205. If the G2 is set to be sufficiently smaller than G1, a characteristic similar to that shown in FIG. 10 is realized.

Figure 14:
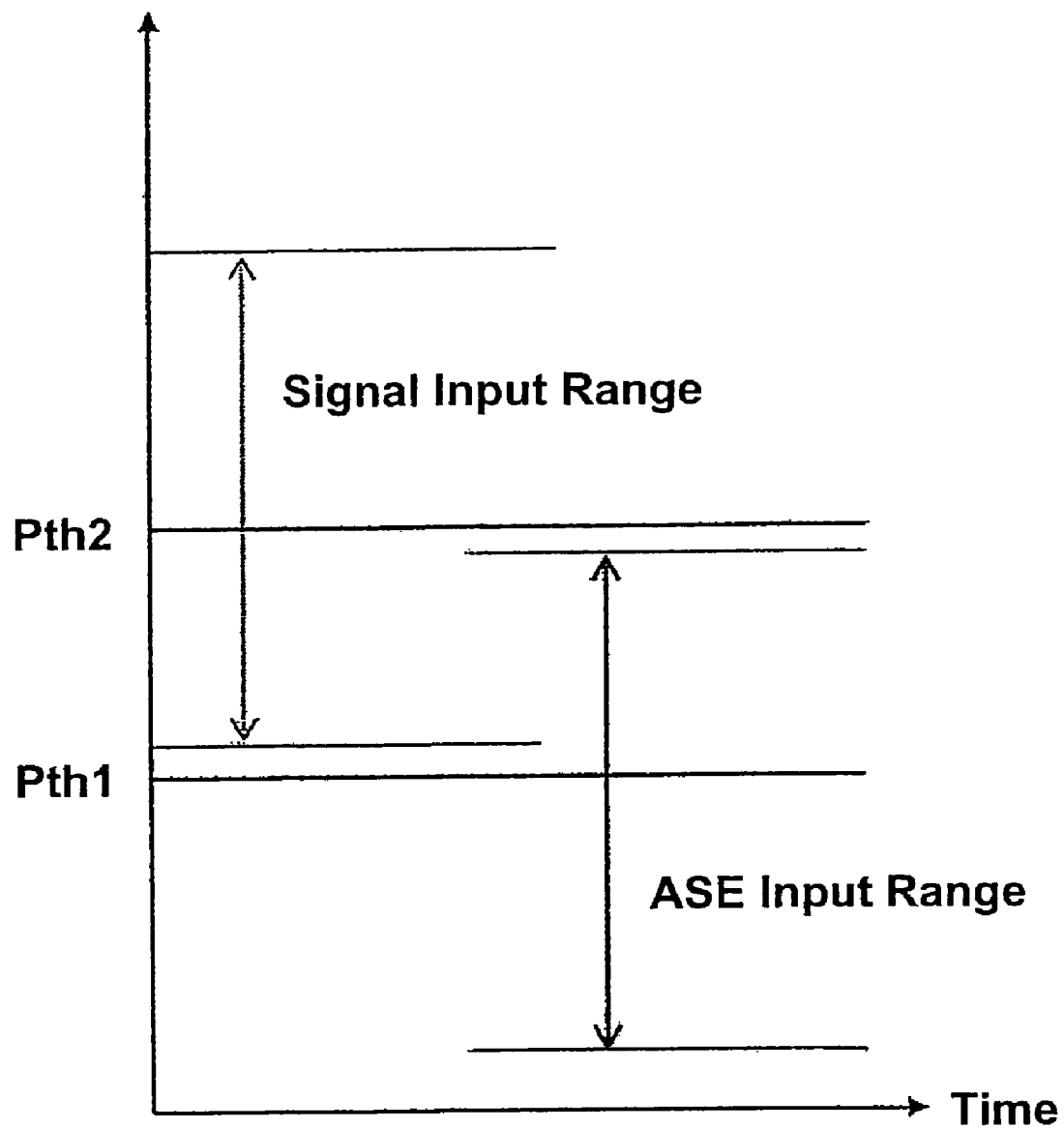
FIG. 14 is a diagram showing two thresholds.

While the input state is determined in the input signal detection devices shown in FIGS. 7 and 8 by comparing the measured value of the AC intensity with the calculated value thereof, the input state is also determined by additionally using the threshold of light power. In this case, as shown in FIG. 14, thresholds Pth1 and Pth2 are previously set near the lower limit value of the signal input range and near the upper limit value of the ASE input range, respectively.

If the total intensity is larger than the Pth2, it is determined that a signal has been inputted. If the total intensity lies between the Pth1 and Pth2, a determination is made additionally using the AC intensity. If the total intensity is smaller than the Pth1, it is determined that no signal has been inputted.

Figure 15:
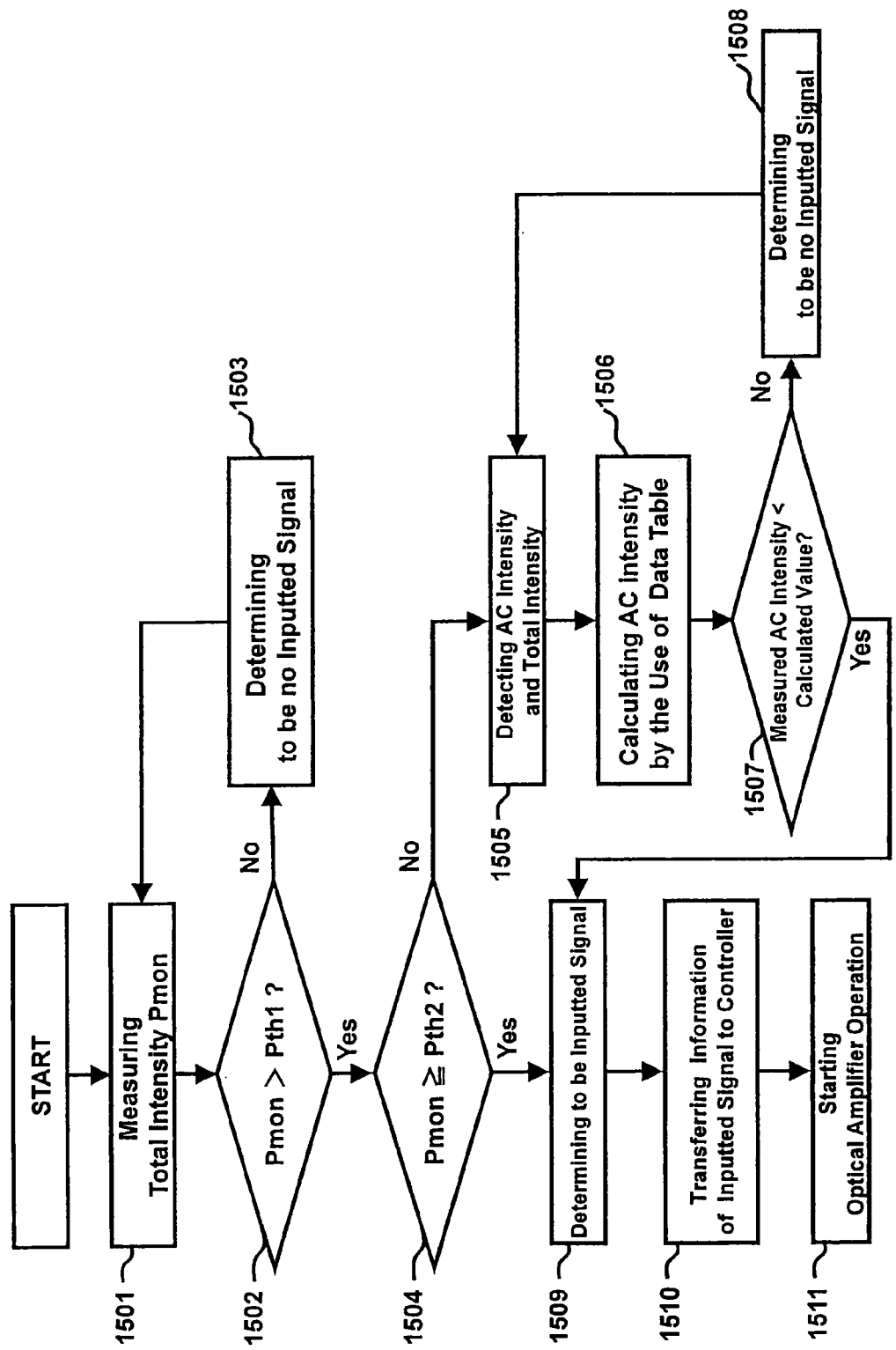
FIG. 15 is a flowchart of third optical amplifier start control.

FIG. 15 is a flowchart of such optical amplifier start control. First, the intensity monitor 205 measures total intensity Pmon (step 1501).

Next, the determination processor 206 compares the Pmon with the Pth1 (step 1502). If the Pmon is equal to or smaller than the Pth1, the determination processor 206 determines that no signal has been inputted (step 1503), and repeats operations in steps 1501 and later.

If the Pmon is larger than the Pth1, the determination processor 206 compares the Pmon with the Pth2 (step 1504). If the Pmon is smaller than the Pth2, the determination processor 206 performs operations similar to those in steps 701 to 704 (steps 1505 to 1508).

If the measured value of the AC intensity is smaller than the calculated value thereof in step 1507, the determination processor 206 determines that a signal has been inputted (step 1509) and performs operations similar to those in steps 706 and 707 (steps 1510 to 1511).

If the Pmon is equal to or larger than the Pth2 in step 1504, the determination processor 206 determines that a signal has been inputted (step 1509) and performs operations in steps 1510 and 1511.

Figure 16:
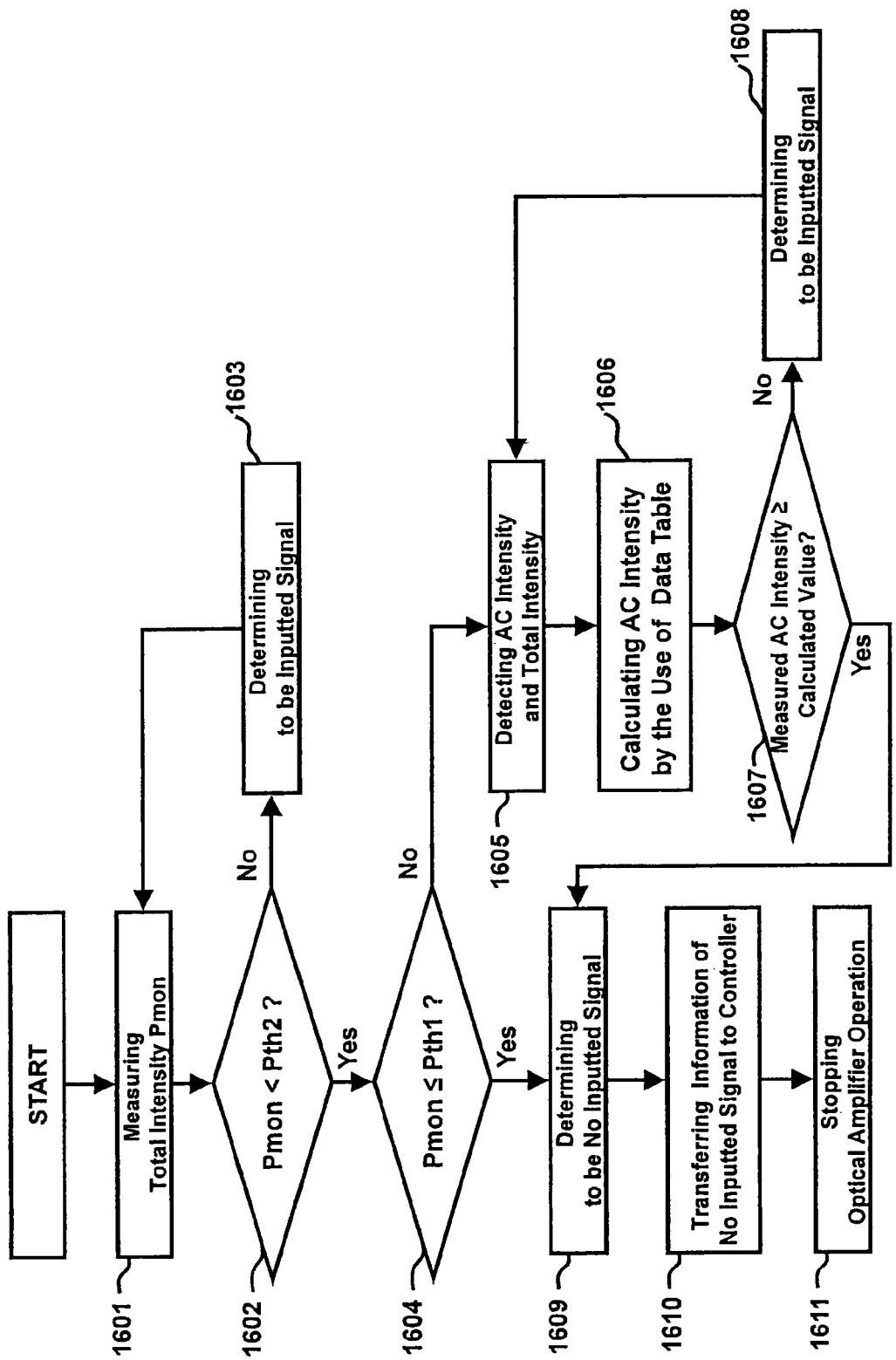
FIG. 16 is a flowchart of third optical amplifier stop control.

FIG. 16 is a flowchart of optical amplifier stop control. First, the intensity monitor 205 measures the total intensity Pmon (step 1601).

Next, the determination processor 206 compares the Pmon with the Pth2 (step 1602). If the Pmon is equal to or larger than the Pth2, the determination processor 206 determines that a signal has been inputted (step 1603), and repeats the operations in steps 1601 and later.

If the Pmon is smaller than the Pth2, the determination processor 206 compares the Pmon with the Pth1 (step 1604). If the Pmon is larger than the Pth1, the determination processor 206 performs operations similar to those in steps 801 to 804 (steps 1605 to 1608).

If the measured value of the AC intensity is equal to or larger than the calculated value thereof in step 1607, the determination processor 206 determines that no signal has been inputted (step 1609) and performs operations similar to those in steps 806 and 807 (steps 1610 to 1611).

If the Pmon is equal to or smaller than Pth1 in step 1604, the determination processor 206 determines that no signal has been inputted (step 1609) and performs operations similar to those in steps 1610 and 1611.

While the input state is determined from the total intensity and AC intensity in the above embodiment, the DC intensity may be monitored instead of the total intensity, since the DC intensity is dominant in the total intensity.

Figure 17:
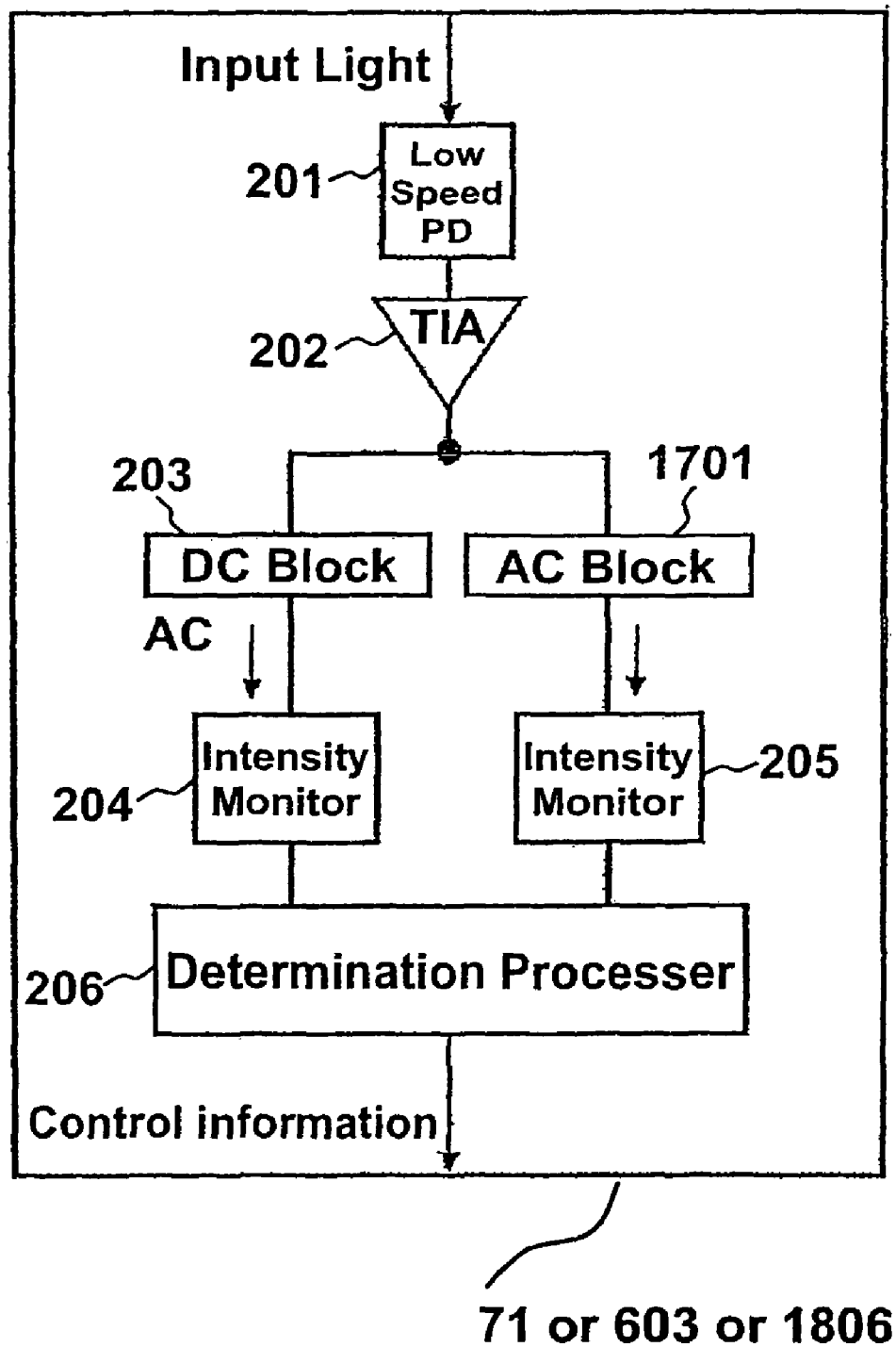
FIG. 17 shows a configuration example of a fourth input signal detection device.

FIG. 17 shows a configuration example of such an input signal detection device 71 or 603 or 1806. In this input signal detection device 71 or 603 or 1806, an AC block 1701 is provided between the TIA 202 and the intensity monitor 205. The AC block 1701 extracts a DC component from an output of the TIA 202 and outputs the DC component to the intensity monitor 205. The AC block 1701 includes, for example, a low-path filter including a coil.

The order, number, or the like of components may be changed in the configuration examples of the above-mentioned input signal detection devices if each apparatus is provided with a function of monitoring desired intensity. Also, these input signal detection devices may be disposed inside an optical amplifier rather than outside.

Figure 18:
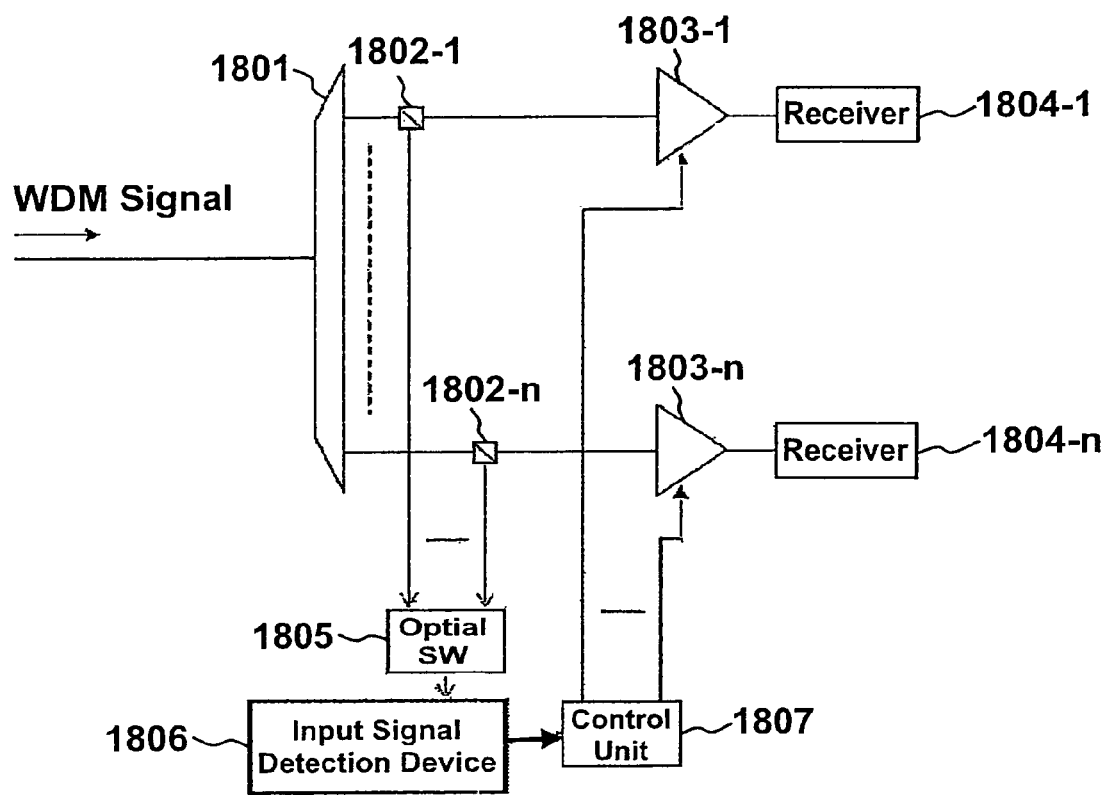
FIG. 18 shows a configuration diagram of a second optical amplifier control system.

FIG. 18 shows a configuration example of a system for controlling multiple optical amplifiers using one input signal detection device. This system includes an optical demultiplexer 1801, optical couplers 1802-1 to 1802-n, optical amplifiers 1803-1 to 1803-n, optical receivers 1804-1 to 1804-n, an optical switch 1805, an 1806, and a controller 1807.

The optical demultiplexer 1801 divides a WDM signal into n channels of optical signals. The optical switch 1805 selects any one of the n channels of optical signals inputted via the optical couplers 1802-1 to 1802-n and outputs the selected optical signal to the input signal detection device 1806. The controller 1807 controls the operation of the optical amplifiers 1803-1 to 1803-n using the result of the determination with respect to each channel.

Figure 19:
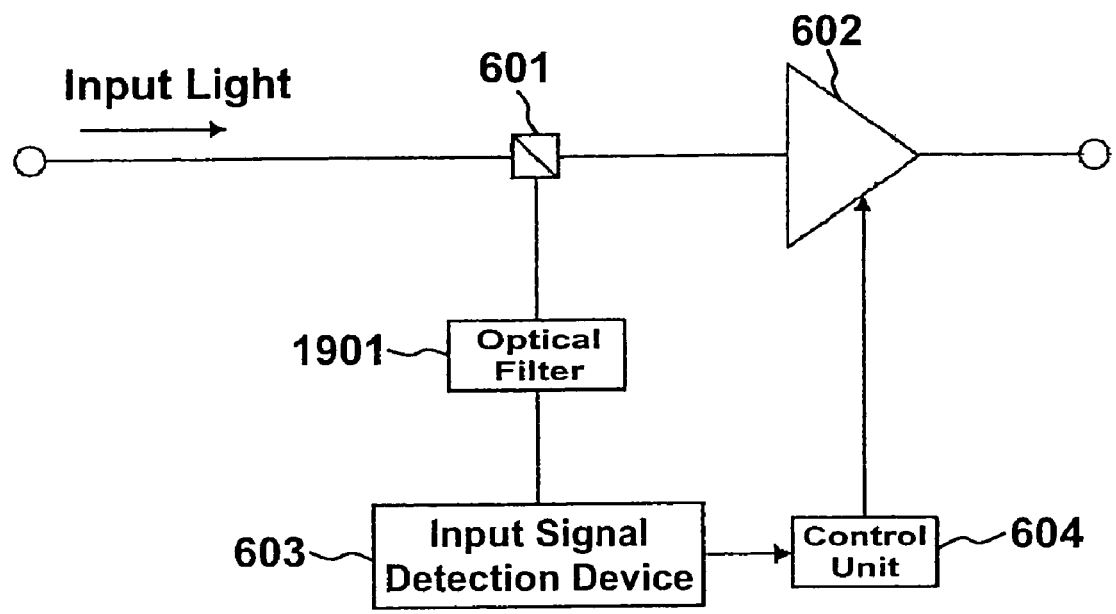
FIG. 19 is a configuration diagram of a third optical amplifier control system.

FIG. 19 shows a configuration example of a system for limiting the bandwidth of light inputted to an input signal detection device using an optical filter. This system has a configuration in which a variable or fixed optical filter 1901 is provided between the optical coupler 601 and the input signal detection device 603 in the optical amplifier control system shown in FIG. 6.

Figure 20:
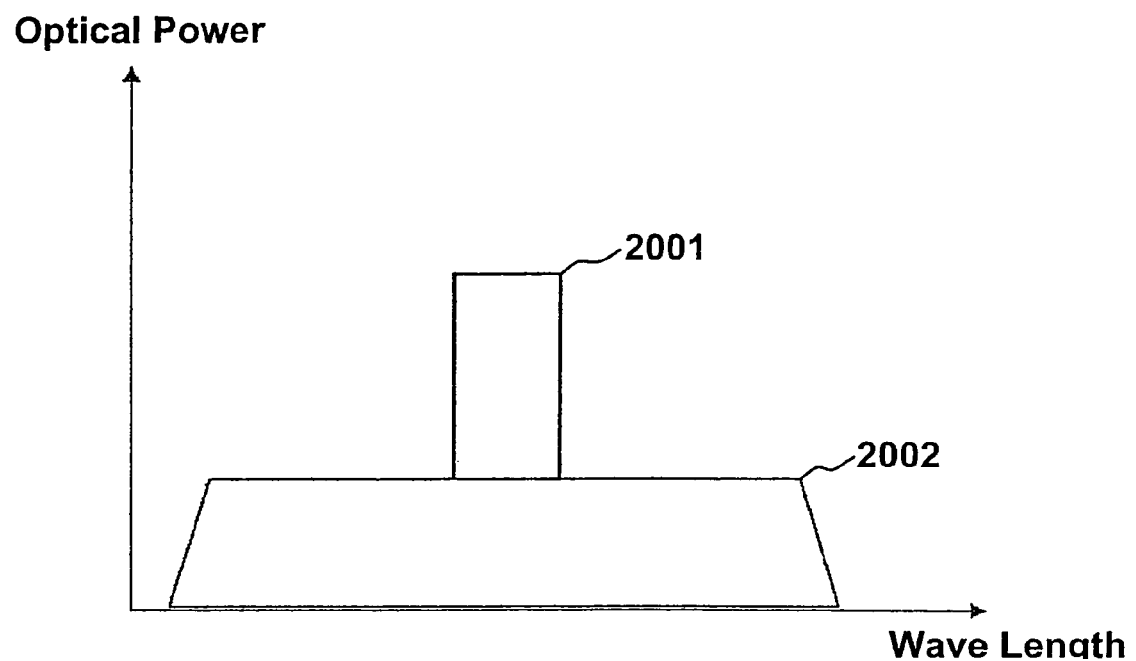
FIG. 20 is a graph showing the spectrum of input light in a case where no optical filter is provided.
Figure 21:
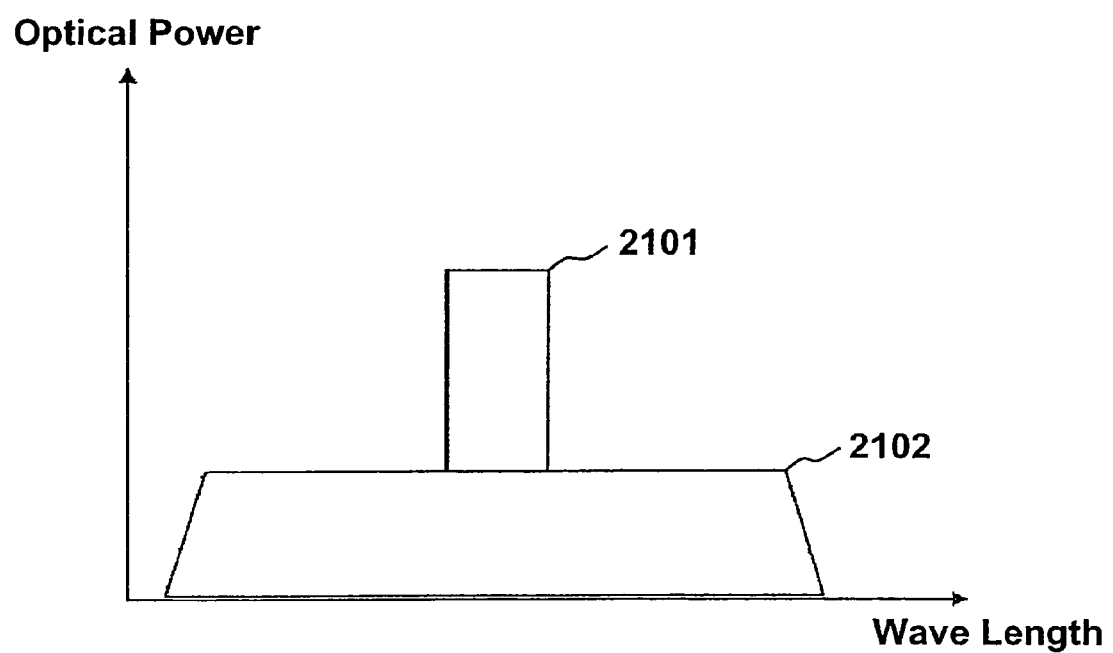
FIG. 21 is a graph showing the spectrum of input light in a case where an optical filter is provided.
Figure 22:
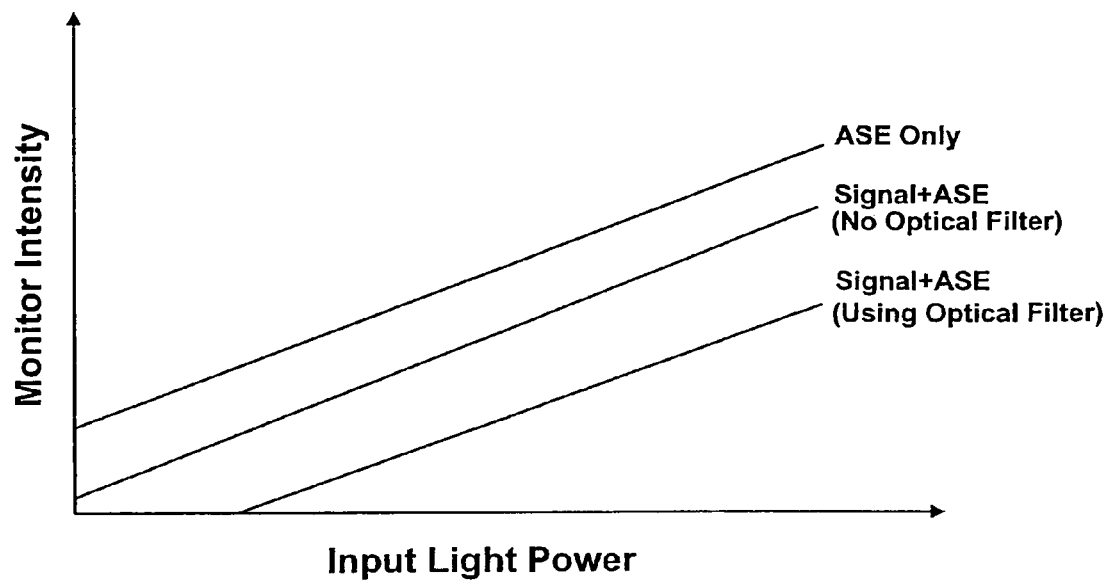
FIG. 22 is a graph showing the dependence of the AC intensity on the input light power in a case where no optical filter is provided.

If the optical filter 1901 is not provided, a signal 2001 and an ASE 2002 extending over a wide wavelength range are contained in input light of the signal input detection system 603, as shown in FIG. 20. On the other hand, if the optical filter 1901 is provided, a signal 2101 and an ASE 2102 corresponding to the bandwidth are contained in input light thereof, as shown in FIG. 21. Therefore, as shown in FIG. 22, the difference in AC intensity between a case where only an ASE has been inputted and a case where a signal and an ASE have been inputted is increased. Thus, the input state is easily determined.

Figure 23:
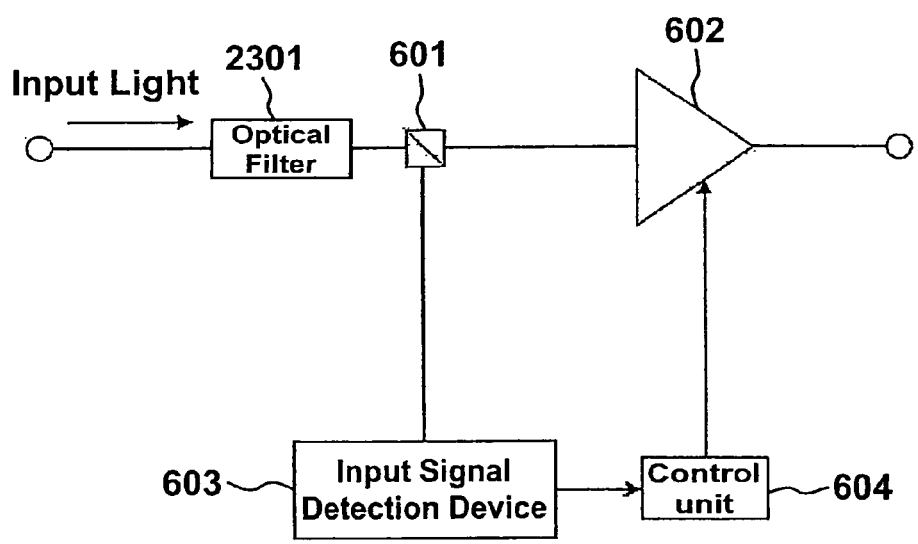
FIG. 23 is a configuration diagram of a fourth optical amplifier control system.

FIG. 23 shows another configuration example of the optical amplifier control system using an optical filter. This system has a configuration in which a variable or fixed optical filter 2301 is provided on the input side of the optical coupler 601 in the optical amplifier control system shown in FIG. 6. Also in this case, an advantage in that the input state is easily determined is obtained, as in the configuration shown in FIG. 19.

An OSNR may be calculated from the measured value of the AC intensity using the above-mentioned input signal detection device. In this case, data on a curve indicating the dependence of the AC intensity on the OSNR is previously obtained for each value of the input light power while changing the power, and the obtained data is stored as a data table in the determination processor 206.

Figure 24:
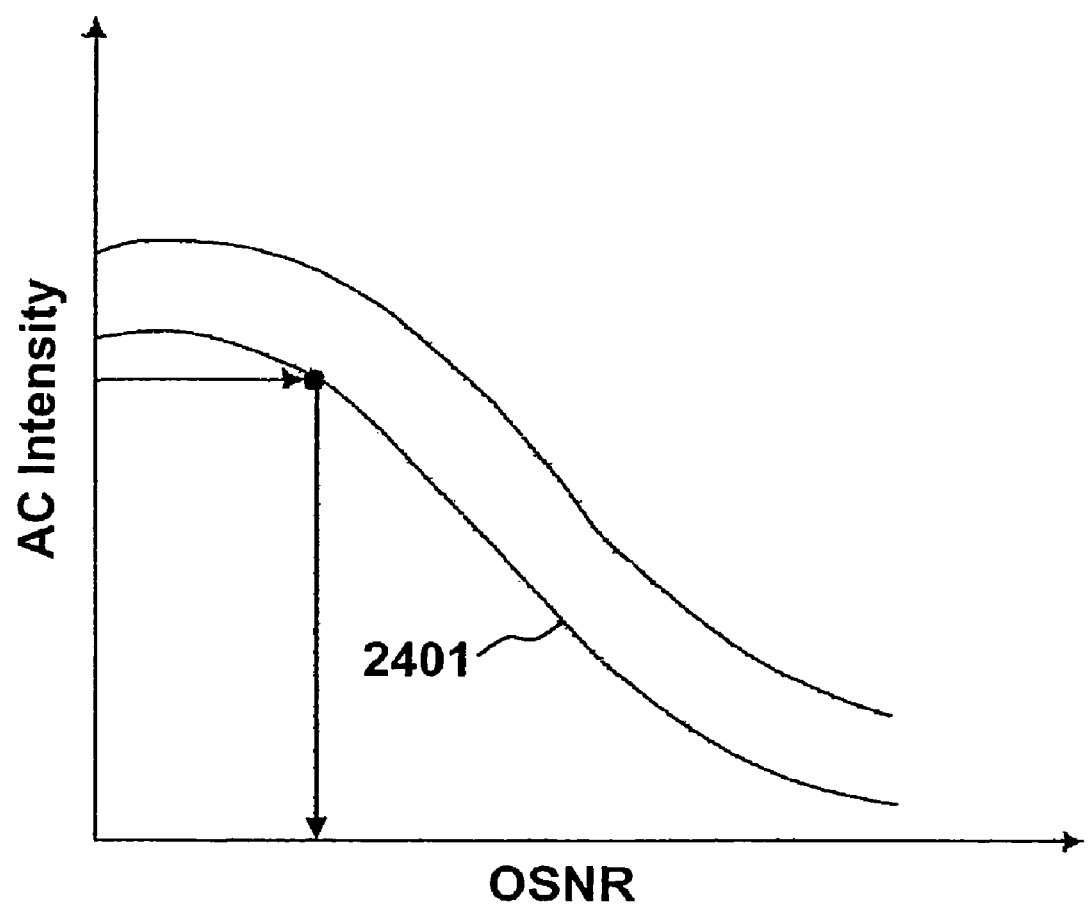
FIG. 24 is a graph showing the dependence of the AC intensity on the OSNR.

During operation of the system, the determination processor 206 selects a curve 2401 according to the measured value of the total intensity (input light power), as shown in FIG. 24, and calculates an OSNR corresponding to the measured value of the AC intensity using data on the curve 2401.

Incidentally, the AC intensity measured by the input signal detection device varies with the modulation system of an optical signal. The AC intensity in a case where a signal modulated according to the intensity modulation system has been inputted is larger than that in a case where only an ASE has been inputted. The AC intensity in a case where a signal modulated according to the phase modulation system has been inputted is smaller than that in a case where only an ASE has been inputted. Therefore, it is determined which modulation system's signal has been inputted, by comparing the measured value of the AC intensity and the AC intensity in a case where only an ASE has been inputted.

Figure 25:
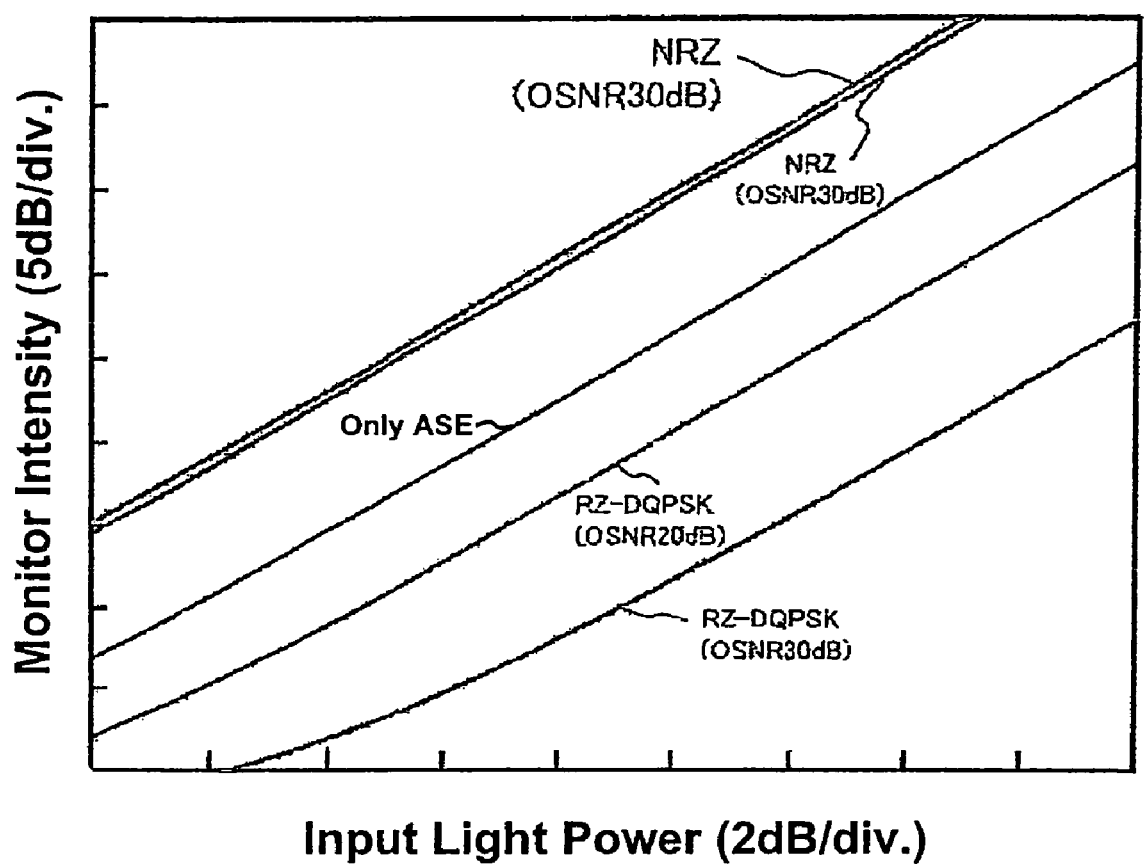
FIG. 25 is a graph showing the difference in the AC intensity between modulation systems.

FIG. 25 shows the difference in the dependence of the AC intensity on the input light power between the two modulation systems. The AC intensity in a case where non-return to zero (NRZ) modulation (intensity modulation) is used is larger than that in the case of only an ASE, and the AC intensity in a case where return to zero-differential quadrature phase shift keying (RZ-DQPSK) modulation (phase modulation) is used is smaller than that in the case of only an ASE.

If phase modulation is used, the input state is determined by using the control methods shown in FIGS. 7, 8, 11, 12, 15, and 16. On the other hand, if intensity modulation is used, the direction of the inequality sign must be reversed in steps 703, 803, 1102, 1202, 1507, and 1607 to make a determination. Also, if the control methods shown in FIGS. 11 and 12 are used, the amount of. loss produced by the attenuator 901 or the gains of the TIA 1301 and 1302 must be adjusted so that total intensity is detected above the AC intensity in a case where only an ASE has been inputted, unlike in FIG. 10.

While an optical signal of one wavelength is selected and inputted to the input signal detection device in the optical amplifier control system shown in FIG. 18, an optical signal of multiple wavelengths, such as a WDM signal, may directly be inputted.

Figure 26:
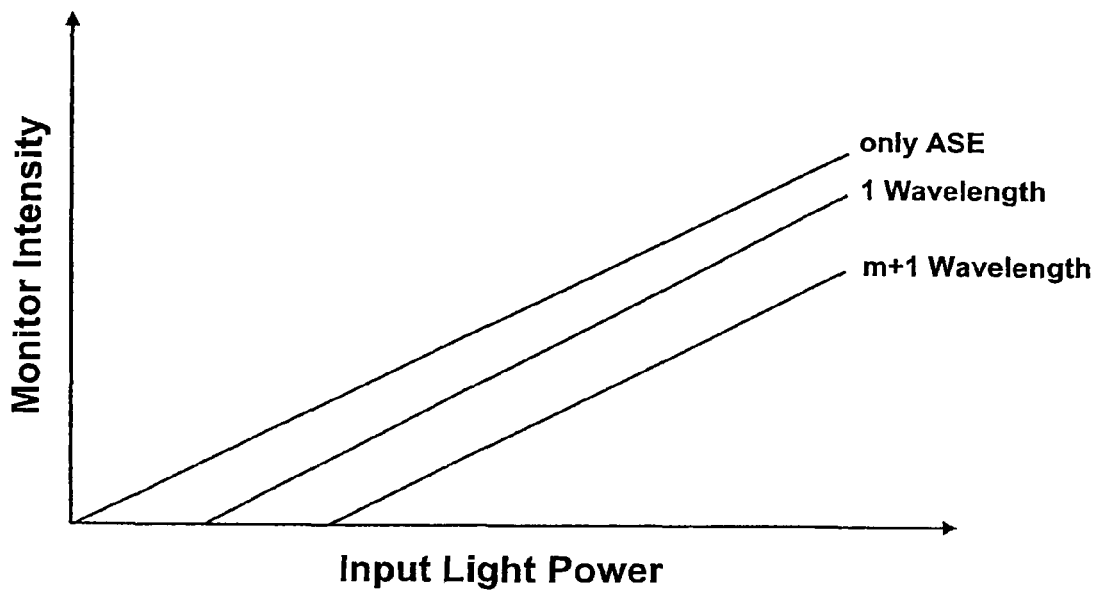
FIG. 26 is a graph showing variations in AC intensity according to the number of wavelengths in the case of phase modulation.

FIG. 26 shows variations in AC intensity according to the number of wavelengths in a case where phase modulation is used. In this case, the AC intensity in a case where a signal of the m+1 (m is a natural number) number of wavelengths has been inputted is smaller than that in a case where a signal of one wavelength has-been inputted. That is, the AC intensity becomes smaller as the number of wavelengths becomes larger. Therefore, the AC intensity in a case where a signal of the m+1 number of wavelengths has been inputted is easily distinguished from the AC intensity in the case of only an ASE.

Figure 27:
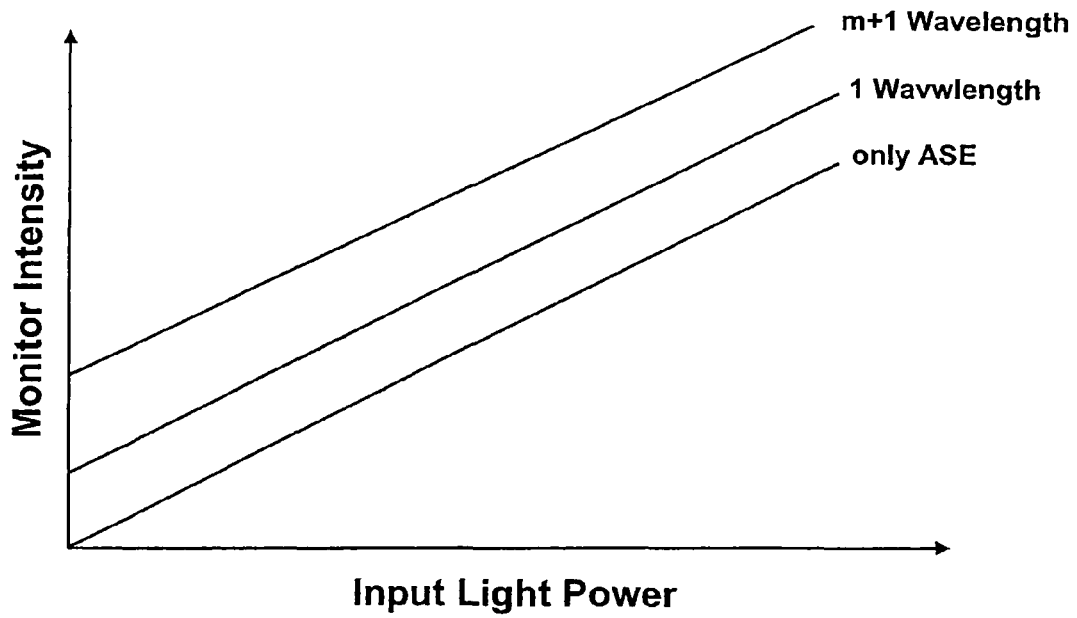
FIG. 27 is a graph showing variations in AC intensity according to the number of wavelengths in the case of intensity modulation.
Figure 28:
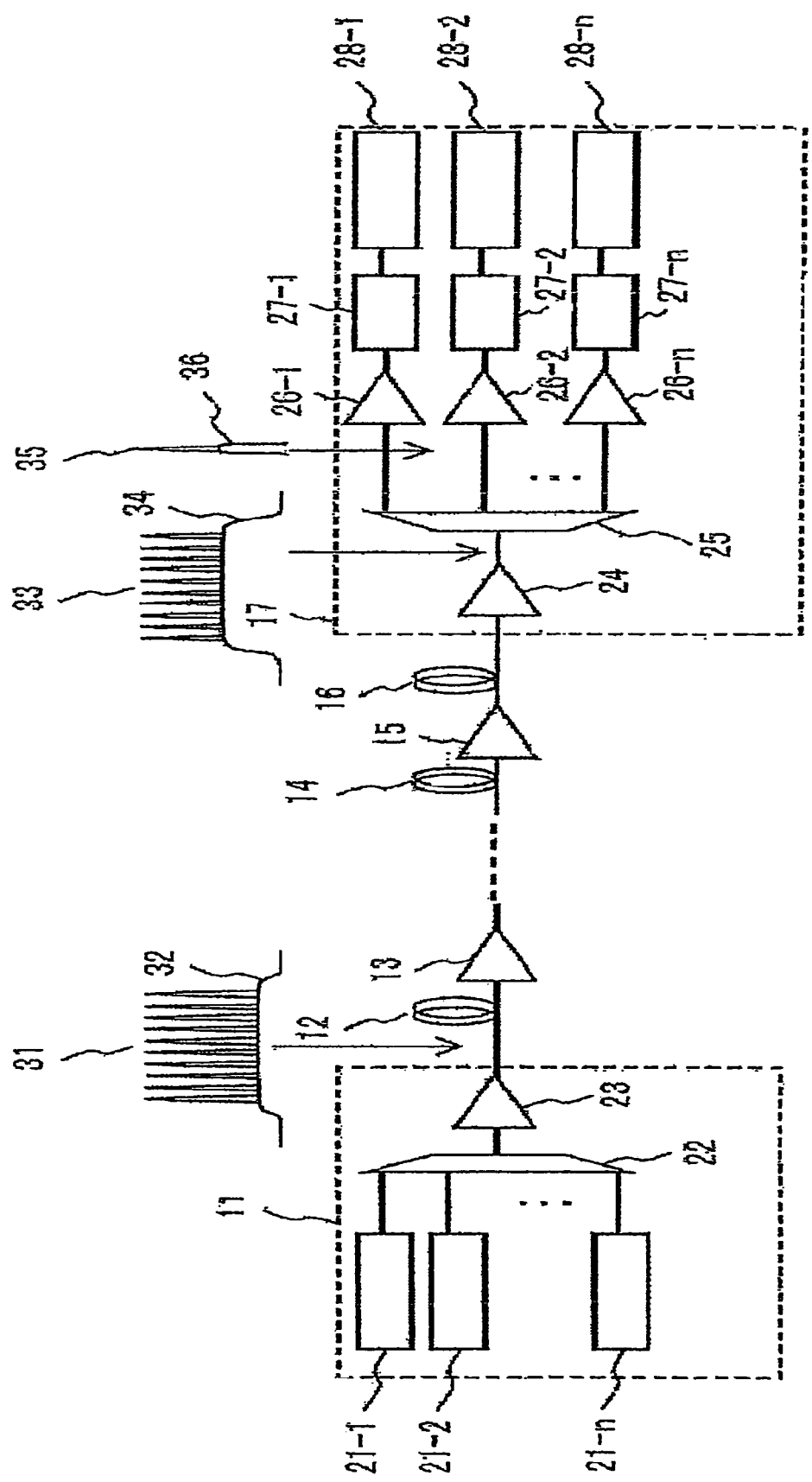
FIG. 28 is a configuration diagram of a related art optical communication system.
Figure 29:
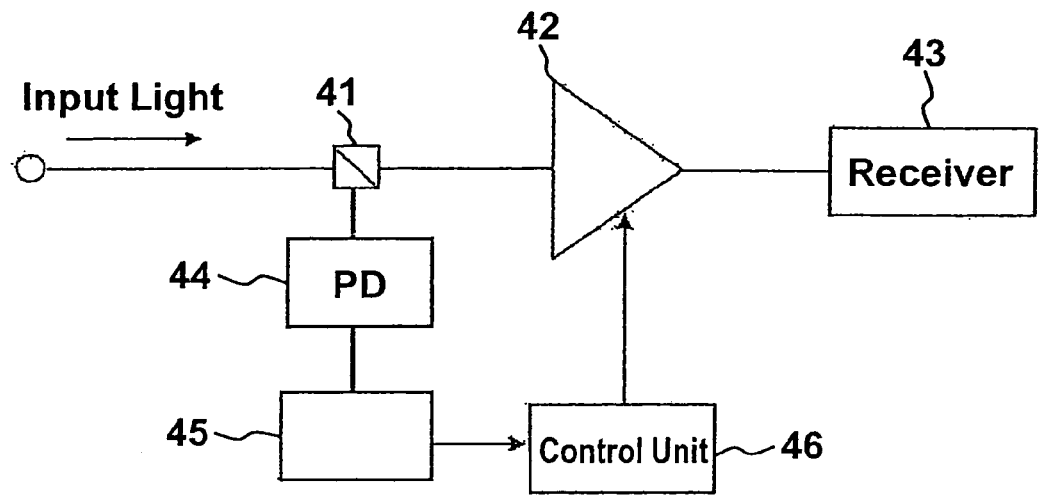
FIG. 29 is a configuration diagram of a related art optical amplifier system.
Figure 30:
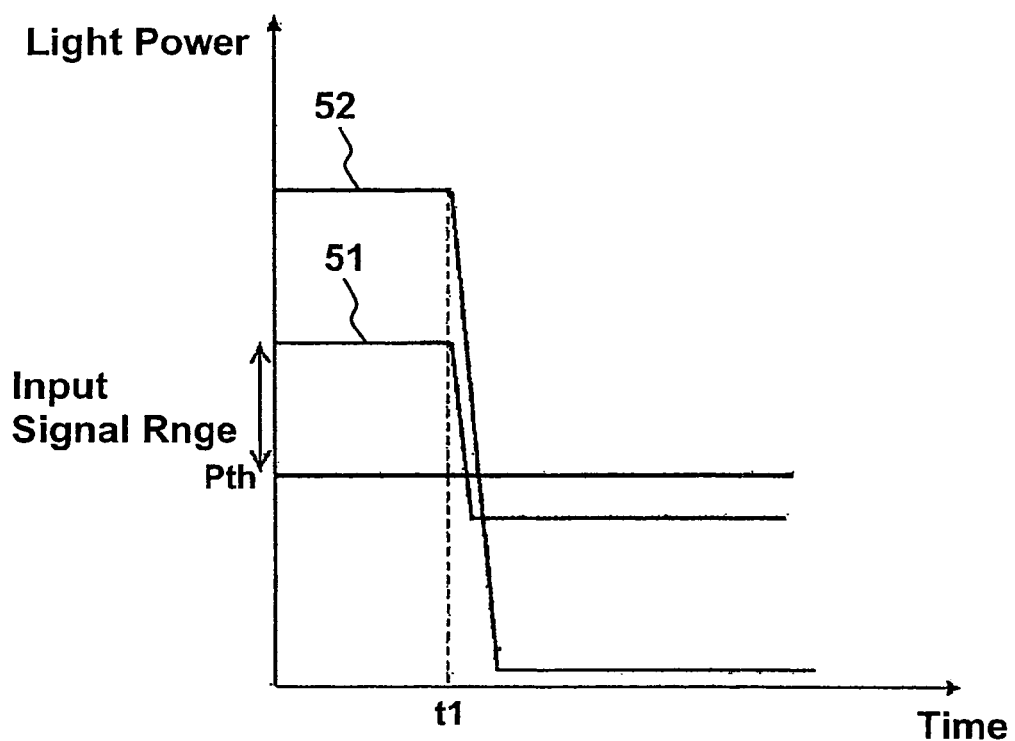
FIG. 30 is a diagram showing a related art optical amplifier control method.
Figure 31:
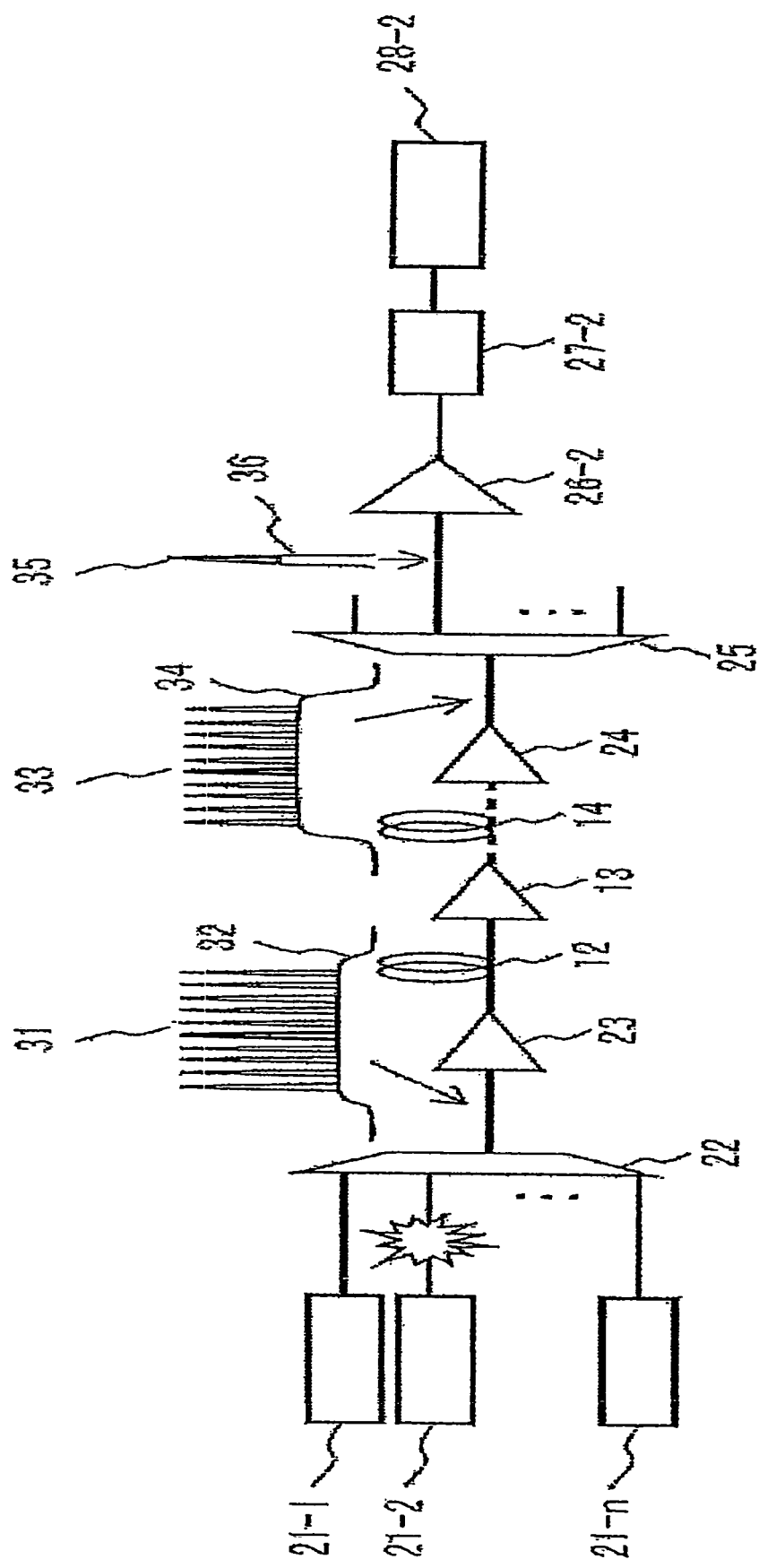
FIG. 31 is a diagram showing a state in which a signal having one channel is turned off.
Figure 32:
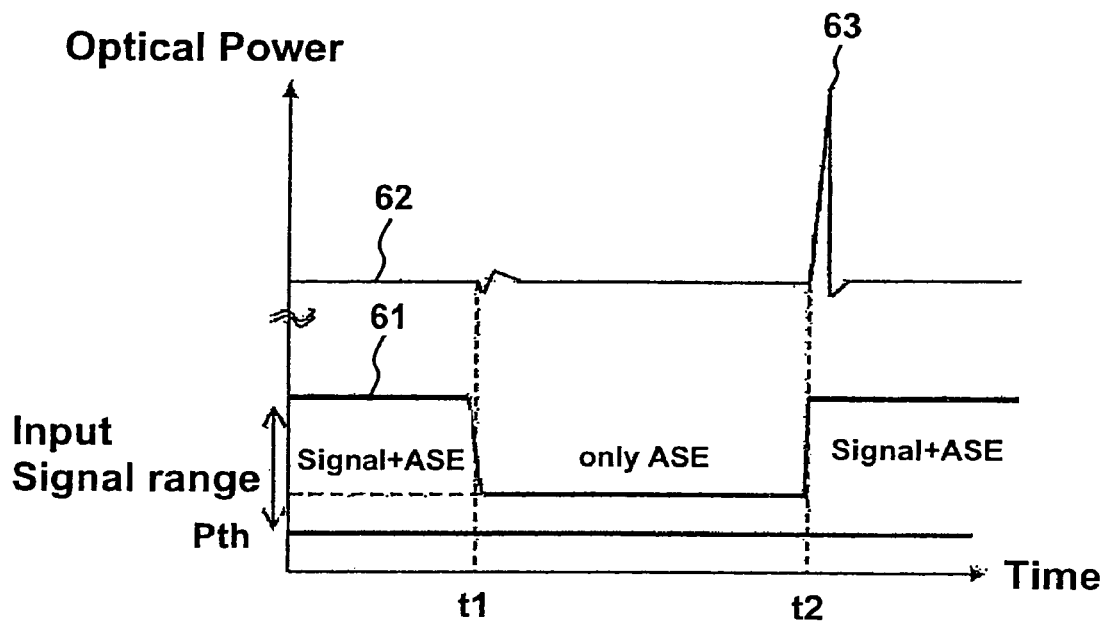
FIG. 32 is a graph showing occurrence of an optical surge.
Figure 33:
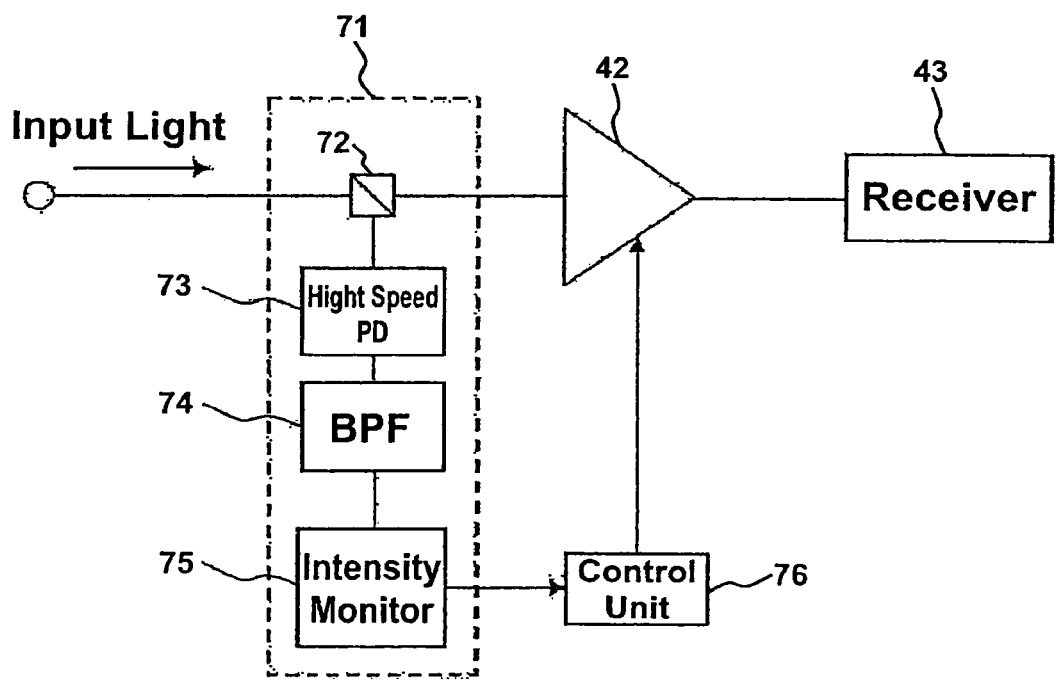
FIG. 33 is a diagram showing an improvement measure to detect whether or not a signal has been inputted.

FIG. 27 shows variations in AC intensity according to the number of wavelengths in a case where intensity modulation is used. In this case, the AC intensity in a case where a signal of the m+1 number of wavelengths has been inputted is larger than that in a case where a signal of one wavelength has been inputted. That is, the AC intensity becomes larger as the number of wavelengths becomes larger. Therefore, the AC intensity in a case where a signal of the m+1 number of wavelengths has been inputted is easily distinguished from the AC intensity in the case of only an ASE.

The input signal detection device is provided at the input terminal of the optical amplifier in the above-described embodiment; however, without being limited to this, the input signal detection device may be provided at the input terminal or output terminal of another optical device. For example, by disposing the input signal detection device before any optical receiver or at the input or output terminal of the optical switch and determining the state of an input/output signal of these optical devices, the optical receiver or optical switch is properly controlled.

Advantages

The relatively simple and low-cost configuration according to the embodiment allows determination whether or not a signal has been inputted to the input terminal of an optical device, that is, it allows a distinction between a state in which a signal has been inputted and a state in which only an ASE has been inputted. Thus, the optical device is started and stopped safely and reliably.

Also, it is detected whether or not a signal has been inputted, without depending on the bit rate or format of an optical signal; therefore, systems that have different bit rates or formats are also flexibly supported.

What is claimed is:
1. An input signal detection device comprising:
a low-speed photodiode to convert input light into an electric signal, the low-speed photodiode having a response speed lower than a transmission speed of an input signal;

a first monitor to monitor the electric signal so as to generate a first monitoring signal for indicating an input light intensity of the input light;

a second monitor to monitor an alternating current component of a low frequency range of the electric signal so as to generate a second monitoring signal for indicating an alternating current intensity of the input light; and a discriminator to discriminate whether the input light includes signal light by using of the first monitoring signal and the second monitoring signal.

2. The input signal detection device of claim 1, wherein the discriminator calculates an alternating current intensity in an absence of the signal light in the input light by using the first monitor signal, and compares the calculated alternating current intensity and the monitored alternating current intensity.

3. The input signal detection device of claim 1, wherein the discriminator compares the input light intensity of the first monitor signal with a first threshold level and a second threshold level larger than the first threshold level:

when the input light intensity is smaller than the first threshold level, the discriminator determines that the input light does not include the signal light, and when the input light intensity is larger than the second threshold level, the discriminator determines that the input light includes the signal light.

4. The input signal detection device of claim 1, further comprising:

an attenuator to attenuate the electric signal, wherein the first monitor monitors the attenuated electric signal.

5. The input signal detection device of claim 4, wherein the attenuator attenuates the electric signal so that the input light intensity is between an alternating current intensity when the signal light is not input to the input signal detection device and an alternating current intensity when the signal light is input to the input signal detection device.

6. The input signal detection device of claim 1, wherein the discriminator compares the first monitoring signal with the second monitoring signal.

7. An apparatus for controlling light, comprising:

a optical device adapted to actively control light;

a input signal detection device comprising:

a low-speed photodiode to convert input light into an electric signal, the low-speed photodiode having a response speed lower than a transmission speed of an input signal, a first monitor to monitor the electric signal so as to generate a first monitoring signal for indicating an input light intensity of the input light, a second monitor to monitor an alternating current component of a low frequency range of the electric signal so as to generate a second monitoring signal for indicating an alternating current intensity of the input light, and a discriminator to discriminate whether the input light includes signal light by using of the first monitoring signal and the second monitoring signal; and a controller to control the optical device in accordance with the discriminated result of the discriminator.

8. A method for detecting a signal light in input light, comprising:

converting input light into an electric signal by using a the low-speed photodiode having a response speed lower than a transmission speed of an input signal;

obtaining an intensity of the input light from the electric signal;

obtaining an intensity of an alternating current component of a low frequency range of the input light from the electric signal; and discriminating whether the input light includes signal light by using of the intensity of the input light and the intensity of the alternating current component of the input light.

9. An input signal detection device comprising:

conversion means for converting input light into an electric signal, the conversion means having a response speed lower than a transmission speed of an input signal;

first monitoring means for monitoring the electric signal so as to generate a first monitoring signal for indicating an input light intensity of the input light;

second monitoring means for monitoring an alternating current component of a low frequency range of the electric signal so as to generate a second monitoring signal for indicating an alternating current intensity of the input light; and discriminating means for discriminating whether the input light includes signal light by using of the first monitoring signal and the second monitoring signal.

* * * * *

UNITED STATES PATENT AND TRADEMARK OFFICE
CERTIFICATE OF CORRECTION

| | |
|---|---|
| PATENT NO. | : 8,073,343 B2 |
| APPLICATION NO. | : 12/078343 |
| DATED | : December 6, 2011 |
| INVENTOR(S) | : Masahiro Yuki et al. |

It is certified that error appears in the above-identified patent and that said Letters Patent is hereby corrected as shown below:

Column 12, Line 16, In Claim 8, delete "a the" and insert -- a --, therefor.

Signed and Sealed this
Third Day of April, 2012

David J. Kappos
*Director of the United States Patent and Trademark Office*